United States Patent
Bregler et al.

(10) Patent No.: US 10,114,626 B2
(45) Date of Patent: Oct. 30, 2018

(54) DATABASE LEVEL CONTAINERS

(71) Applicant: SAP SE, Walldorf (DE)

(72) Inventors: Jonathan Bregler, Walldorf (DE); Alexander Bunte, Walldorf (DE); Arne Harren, Walldorf (DE); Andreas Kellner, Walldorf (DE); Daniel Kuntze, Walldorf (DE); Vladislav Leonkev, Sandhausen (DE); Simon Lueders, Walldorf (DE); Volker Sauermann, Walldorf (DE); Michael Schnaubelt, Walldorf (DE); Le-Huan Stefan Tran, Walldorf (DE); Michael Wintergerst, Walldorf (DE); Cornelia Kinder, Walldorf (DE); Christopher Schildt, Walldorf (DE); Andreas Thumfart, Walldorf (DE); Ralph Debusmann, Walldorf (DE); Andre Hildebrandt, Walldorf (DE); Stefan Baeuerle, Rauebberg-Rotenberg (DE); Meinolf Block, Walldorf (DE); Klaus Kopecz, Walldorf (DE); Anil K. Goel, Walldorf (DE); Roger Killian-Kehr, Walldorf (DE)

(73) Assignee: SAP SE, Waldorf (DE)

( * ) Notice: Subject to any disclaimer, the term of this patent is extended or adjusted under 35 U.S.C. 154(b) by 311 days.

(21) Appl. No.: 14/949,256

(22) Filed: Nov. 23, 2015

(65) Prior Publication Data

US 2017/0147311 A1    May 25, 2017

(51) Int. Cl.
*G06F 17/30* (2006.01)
*G06F 8/60* (2018.01)
*G06F 8/70* (2018.01)
*G06F 8/30* (2018.01)

(52) U.S. Cl.
CPC .............. *G06F 8/60* (2013.01); *G06F 8/30* (2013.01); *G06F 8/70* (2013.01); *G06F 17/30294* (2013.01); *G06F 17/30557* (2013.01)

(58) Field of Classification Search
CPC ......... G06F 17/30371; G06F 17/30557; G06F 17/30569; G06F 17/30377
See application file for complete search history.

(56) References Cited

U.S. PATENT DOCUMENTS

| 2015/0248280 A1* | 9/2015 | Pillay | G06F 8/60 717/106 |
| 2016/0094647 A1* | 3/2016 | Mordani | H04L 47/70 709/226 |

* cited by examiner

*Primary Examiner* — Jeffrey A Burke
*Assistant Examiner* — Cindy Nguyen
(74) *Attorney, Agent, or Firm* — Mintz, Levin, Cohn, Ferris, Glovsky and Popeo, P.C.

(57) ABSTRACT

A system, a method, and a computer program product for deployment of objects are disclosed. Using a deployment infrastructure of a database system, a deployment container for deployment of at least one object at runtime of an application is generated. The container includes at least one artifact for the object and a container schema indicative of at least one dependency associated with the object. At least one deployment privilege is associated based on the container schema with the artifact for the object. The artifact of the deployment container is deployed based on the associated deployment schema during runtime of the application. The container can be an isolated container and an access privilege to an object can be requested based on a synonym for deployment purposes.

20 Claims, 11 Drawing Sheets

DATABASE LEVEL CONTAINERS

TECHNICAL FIELD

This disclosure relates generally to data processing and, in particular, to database level containers.

BACKGROUND

Businesses use a plurality of business process applications and/or services in their business operations. Applications and/or services can be programs that an end-user runs to accomplish certain tasks and can work in conjunction with one or more back-end systems, which can store the data to be worked on, such as, for example, business objects and other business data, as well as logic for manipulating the data, such as for example transactions or other business logic. Examples of back-end systems may include database systems, enterprise resource planning ("ERP") systems, and customer relationship management ("CRM") systems. A user interface ("UI") can be designed to work in concert with application programs, and facilitates interaction between humans and computers by inviting and responding to user input. In order to accomplish various tasks, a user can initiate various applications, tasks, agents, etc. that may manipulate data in different ways to achieve results desired by the user.

Users can design and/or create various business process objects, such as sales orders, invoices, etc. A business object can be created using any known computing systems and languages (e.g., one such exemplary language includes advanced business application programming ("ABAP") high level programming language, which is available from SAP SE, Walldorf, Germany). Such created objects can be stored in memory, such as in a database. An example of such database includes a High-Performance Analytic Appliance ("HANA"), which is a column-oriented, in-memory database appliance available from SAP SE, Walldorf, Germany. Objects can be created at design-time for execution at runtime of an application. To accommodate design-time creation and runtime execution, objects need to be deployed at the database. Deployment of objects can be a complicated process and conventionally, can involve a multitude of aspects, such as version control, lifecycle management, special programs, application layer artifacts, and others. This can significantly hinder efficient implementation of database systems, dependency management among objects, etc. Thus, there is a need for a transactional all-or-nothing deployment model that can simplify deployment of database systems.

SUMMARY

In some implementations, the current subject matter relates to a computer implemented method. The method can include generating, using a deployment infrastructure of a database system, a deployment container for deployment of at least one object at runtime of an application. The container can include at least one artifact for the object and a container schema indicative of at least one dependency associated with the object. The method can further include associating, based on the container schema, at least one deployment privilege with the artifact for the object, and deploying, based on the associated deployment schema, the artifact of the deployment container during runtime of the application. At least one of the generating, the associating, and the deploying can be performed by at least one processor of at least one computing system.

In some implementations, the current subject matter can include one or more of the following optional features. The artifact can represent a target state of the object during runtime of the application. The artifact can also specify a view definition of the object in the target state. The artifact can include at least one of the following: a data definition language artifact, a synonym, a table, a view, a role, a privilege, a configuration, a core data service, a function, an index, and any combination thereof.

In some implementations, the method can include repeatedly deploying the artifact and/or the container during runtime of the application. The deployment can include at least one of the following: creating the object during runtime of the application, modifying the object during runtime of the application, and deleting the object during runtime of the application.

In some implementations, the artifact can provide a link to at least another artifact of at least another deployment container. Deployment of the artifact can be independent of another artifact in another deployment container. Deployment of the artifact during runtime of the application can be performed based on a deployment order specified by the dependency.

In some implementations, the method can include isolating the container based on at least one of the following: a database schema, a metadata schema, a database privilege, a technical user associated with the container, a technical user associated with a container schema, and any combination thereof.

In some implementations, the artifact can be a synonym including a link to an object contained within an isolated container and the method can also include requesting an access privilege to the object contained within the isolated container, and performing the deploying based on the access privilege received in response to the requesting.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
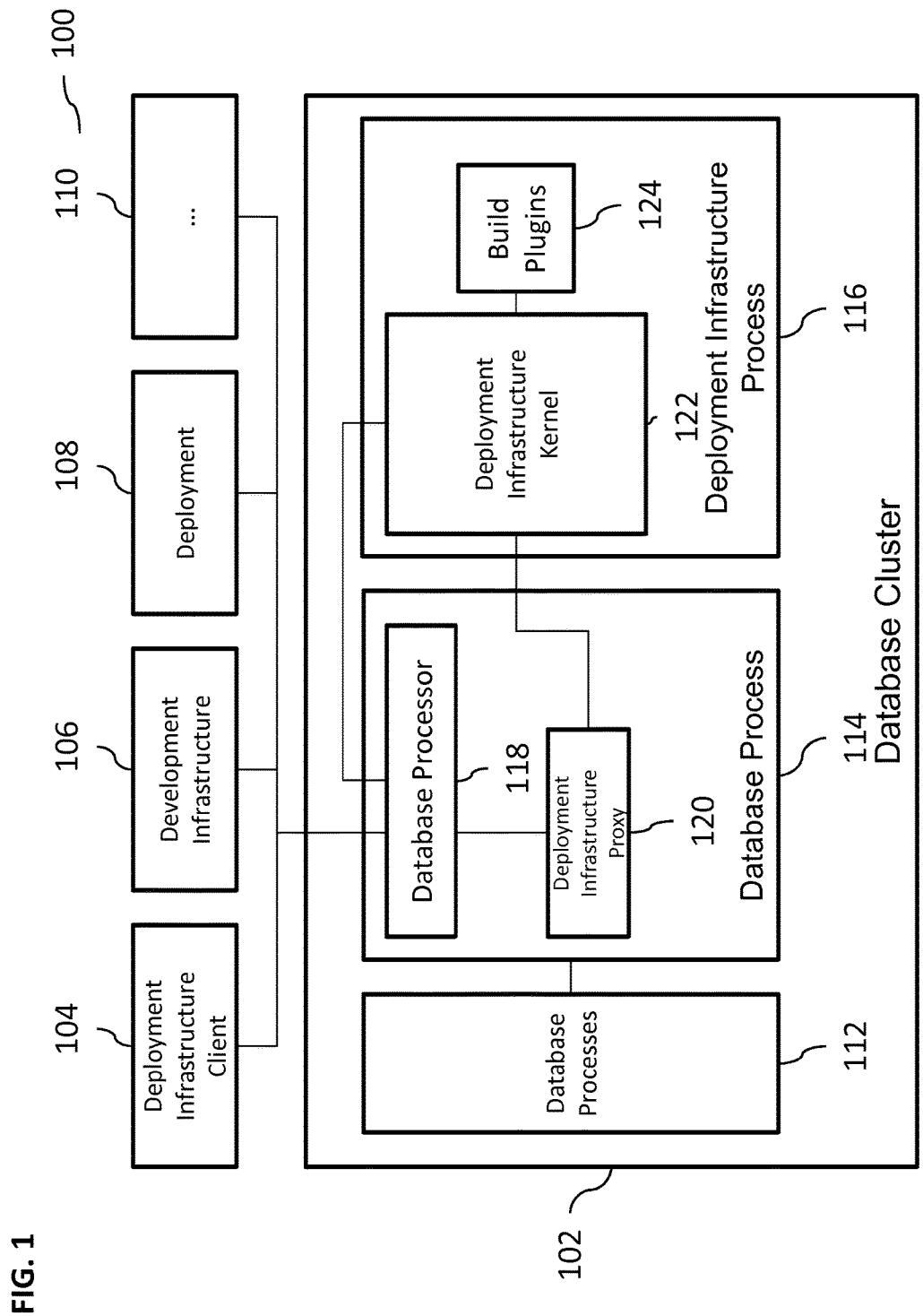
FIG. 1 illustrates an exemplary system implementing a deployment infrastructure, according to some implementations of the current subject matter.

In some implementations, the current subject matter relates to a deployment infrastructure for a High Performance Analytic Appliance ("HANA", as developed by SAP SE, Walldorf, Germany). The deployment infrastructure can be a service layer of the HANA database that can simplify deployment of HANA database artifacts, i.e., design-time objects (e.g., tables, views, etc.). This can be accomplished by providing declarations that define database objects and by ensuring consistent deployment into the database. In some implementations, the deployment can be based on a transactional all-or-nothing deployment model as well as an implicit dependency management. The deployment infrastructure can implement use of containers that can allow multiple deployments and sandboxing. The deployment infrastructure can be used to deploy design-time objects of applications, databases, etc.

In some implementations, the deployment infrastructure can focus on deployment aspects and address development and/or modeling scenarios as part of the HANA database and/or extended application services ("XS", as developed by SAP SE, Walldorf, Germany). Further, the deployment infrastructure can provide artifacts for HANA database objects, e.g., tables, views, calculation views, procedures, core data services ("CDS" as developed by SAP SE, Walldorf, Germany), etc.

In some implementations, the deployment infrastructure can use containers and/or container models for the purposes of deploying database objects. A container can correspond to a database schema. Containers can be used for multiple deployments of the same database artifacts, for development sandboxes, etc. Containers can be isolated from each other by various database mechanisms, e.g., each database schema with its deployed database objects can be owned by a per-schema technical database user. In some implementations, a cross-container access at the database level can be permitted (via database privileges) and/or prohibited.

In some implementations, database objects can be written in a schema-free way (e.g., no explicit schema references) to allow deployment of the same database objects into different containers. References to schema-external objects can be created using synonyms (or table links in case of zero-downtime maintenance ("ZDM")), which can be bound during deployment. The synonyms (or table links) can provide schema-local names for the schema-external objects. Privileges on these schema-external objects can be explicitly granted to the container's technical user (e.g., SELECT-WITH-GRANT-OPTION privileges on schema-external ERP tables).

As stated above, the deployment infrastructure can be a layer on top of the HANA database. For the purposes of creating, modifying, and/or deleting objects inside the database, the deployment infrastructure can use structured query language ("SQL") commands.

In some implementations, the deployment infrastructure can allow modeling of a networked set of persistence objects (e.g., tables, sequences, etc.), views, procedures, functions, data flows, etc. that can be later deployed. These objects can be converted into file-based artifacts, which can simplify dependency-based deployment, re-deployment, and/or undeployment of objects. It can also facilitate lifecycle management aspects, such as transport of objects. File-based artifacts can also allow separation of uploading of the artifacts into deployment infrastructure (i.e., staging), and deployment of the artifacts. Additionally, the artifacts can simplify incremental deployment scenarios where only modified files can be uploaded. The file artifacts can represent the target state of the database objects, e.g., they specify a view definition in a declarative way (for example, instead of imperative CREATE, ALTER, DROP statements).

In some implementations, the deployment infrastructure can perform dependency management by extracting a set of provided and/or required database (i.e., runtime) objects from the file artifacts and can use this information for dependency management during deployment (e.g., to calculate the order in which the database objects need to be created, and/or to detect missing, required objects). Additionally, dependencies can be used to re-deploy database objects that are affected by newly deployed or modified objects.

In some implementations, the deployment infrastructure can use database mechanisms to ensure a transactional all-or-nothing deployment. Modifications of database objects, operations, as well as re-deployments of affected artifacts can be performed inside a single database transaction. In some implementations, a single deployment can operate on a single container with the container boundary being a deployment boundary. For example, affected database objects inside other database schemata are not re-deployed and deployment does not fail if database objects inside other schemata break.

Further, in addition to the schema-based containers, the deployment infrastructure also can use database schemata to isolate its metadata, e.g., to separate storage of file artifacts from the deployed database objects.

In some implementations, the deployment infrastructure can implement build plugins to provide the infrastructure for all deployment aspects. The interpretation of artifacts including the extraction of dependencies and the steps to implement a target-state-based deployment of the artifacts can be performed by such build plugins, which can include, for example, a plugin for a table artifact type, a plugin for a view artifact type, etc. Build plugins can have access to the deployment container (for example, via a SQL-based application programming interface ("API")). In some exemplary implementations, SQL commands that the build plugins need for creating/altering/dropping a database object can be available at the SQL layer of HANA. In addition, these SQL commands can further account for database security constraint and support the deployment infrastructure's transactional deployment, where statements are run inside a single database transaction in non-auto-commit mode.

In some implementations, the deployment infrastructure can be constrained by at least one of the following deployment architectural boundaries: database services, application programming interfaces, and technical users. In some exemplary implementations, the database service instances can be created via a database-specific service broker, e.g., a HANA database service broker. Additionally, a database service instance can correspond to a single database schema and an assigned technical database user. The HANA database service broker can delegate schema creation to the deployment infrastructure, such that the deployment infrastructure can also create its required metadata, database users, and/or database roles inside the database. On deletion of a database service instance, the deployment infrastructure can be called implicitly by the broker in order to delete the container schema, its metadata, etc.

In some implementations, an SQL-based application programming interface can be a lowest common denominator for the deployment infrastructure's API. It can be an API which is accessible via a standard HANA SQL connection.

A technical user can be a technical deployment user for a specific schema-based container. Deployment-related activities, e.g., staging of files, triggering of real deployment into a single container, etc., can be performed by a dedicated technical deployment user. The technical deployment user of the container schema can be different from the technical runtime user of the container schema to allow separation of privileges for deployment and/or runtime access to the deployed database objects.

I. Deployment Infrastructure

FIG. 1 illustrates an exemplary system 100 that can implement a deployment infrastructure, according to some implementations of the current subject matter. The system 100 can include a database cluster 102 (e.g., a HANA cluster), a deployment infrastructure client component 104, an extended services development infrastructure component 106, an extended services deployment component 108, as well as any other components that can be communicatively coupled with the database cluster 102. The components 104-110 can represent technical users that can access the database cluster 102 using, for example, a structured query language.

The database cluster 102 can include various database processes 112, 114 (e.g., HANA database processes), each having a design-time and runtime persistence components (not shown in FIG. 1). As shown in FIG. 1, the database process 114 can include a database processor 118 (e.g., a HANA SQL processor) that can be communicatively coupled to a deployment infrastructure proxy component 120. The deployment infrastructure proxy component 120 can be communicatively coupled to a deployment infrastructure process 116. The deployment infrastructure process 116 can include a deployment infrastructure kernel 122 (e.g., a HANA deployment infrastructure kernel) and at least one design-time build plugin component 124.

In some implementations, the technical users 104-110 can access the deployment infrastructure proxy component 120 via the database processor 118. The proxy component 120 then communicates with the kernel 122 via a network protocol connection. The kernel 122 accesses design-time build plugin(s) 124 to generate/create/modify various objects, which are then supplied by the kernel to the database processor 118 and can, thereafter, be persisted by the database processor 118.

In some implementations, the system 100 can provide an SQL-based API for the deployment infrastructure that can be accessed via a standard SQL connection, where the API can be exposed at the SQL layer. As shown in FIG. 1, system 100 can represent the system's target architecture for the deployment infrastructure in order to provide the API at the SQL layer and keep the deployment infrastructure kernel 122 and the deployment infrastructure design-time build plugin(s) 124 isolated in its own operation system process.

For the purposes of decoupling, the deployment infrastructure can provide database procedures for its APIs. Communication from the database process 114 (also referred to as hdbindexserver) towards the deployment infrastructure process 116 (also referred to as hdbdiserver) can be provided via a deployment infrastructure proxy library which can be loaded into the database process 114. This proxy can implement database procedures and/or client-side of a deployment infrastructure network protocol. All incoming requests can be routed to the deployment infrastructure process using this network protocol. In some implementations, the components 122 and 124 can also be inside the database process 114.

The deployment infrastructure process 116 can communicate to the database process 114 via an internal application programming interface (e.g., HANA's internal EAPI Thin Layer SQL client) on a new database transaction. This new transaction is not related to the database transaction in which the deployment infrastructure command is sent to the database process 114. The SQL communication from deployment infrastructure towards the database process 114 can be a trusted communication which can allow deployment infrastructure to execute SQL statements on behalf of different technical users inside a single database transaction in order to implement different security features at the database layer.

II. Deployment Infrastructure Containers

In some implementations, the deployment infrastructure can use schema-based containers, which can be database service instances which can correspond to a database schema and a set of technical users. The database broker can call the deployment infrastructure to create the application's container schema and its required metadata (e.g., companion schemata, technical users, etc.) via deployment infrastructure's container management API.

A single deployment via the deployment infrastructure can operate on one schema-based container. If multiple schemata are involved, then multiple deployments via the deployment infrastructure can be implemented, i.e., one for each schema. In case of ZDM, each data schema and each access schema can be considered a separate schema which can be deployed using its own deployment.

Figure 2:
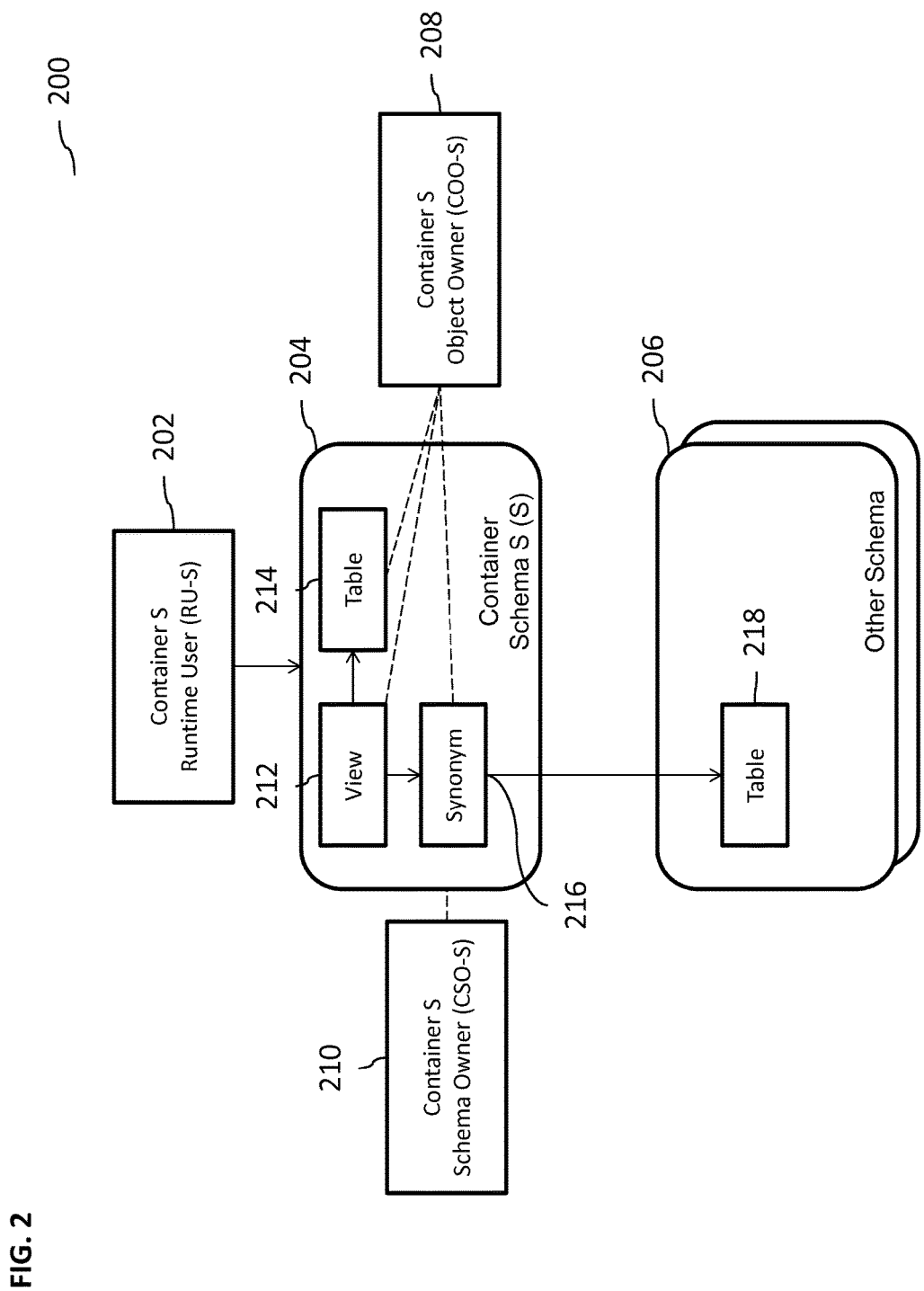
FIG. 2 illustrates an exemplary container in a database schema, according to some implementations of the current subject matter.

FIG. 2 illustrates an exemplary container 200 in a database schema, according to some implementations of the current subject matter. The container 200 can include a container runtime user 202 (e.g., container S runtime user ("RU-S")), a container schema 204 (e.g., container S schema ("S")), other schema(s) 206, a container object owner 208 (e.g., container S object owner ("COO-S")), and a container schema owner 210 (e.g., container S schema owner ("CSO-S")). The container schema can include a view object 212, a table object 214, and a synonym object 216. The synonym 216 can link to a table 218 in an external schema 206.

Figure 3:
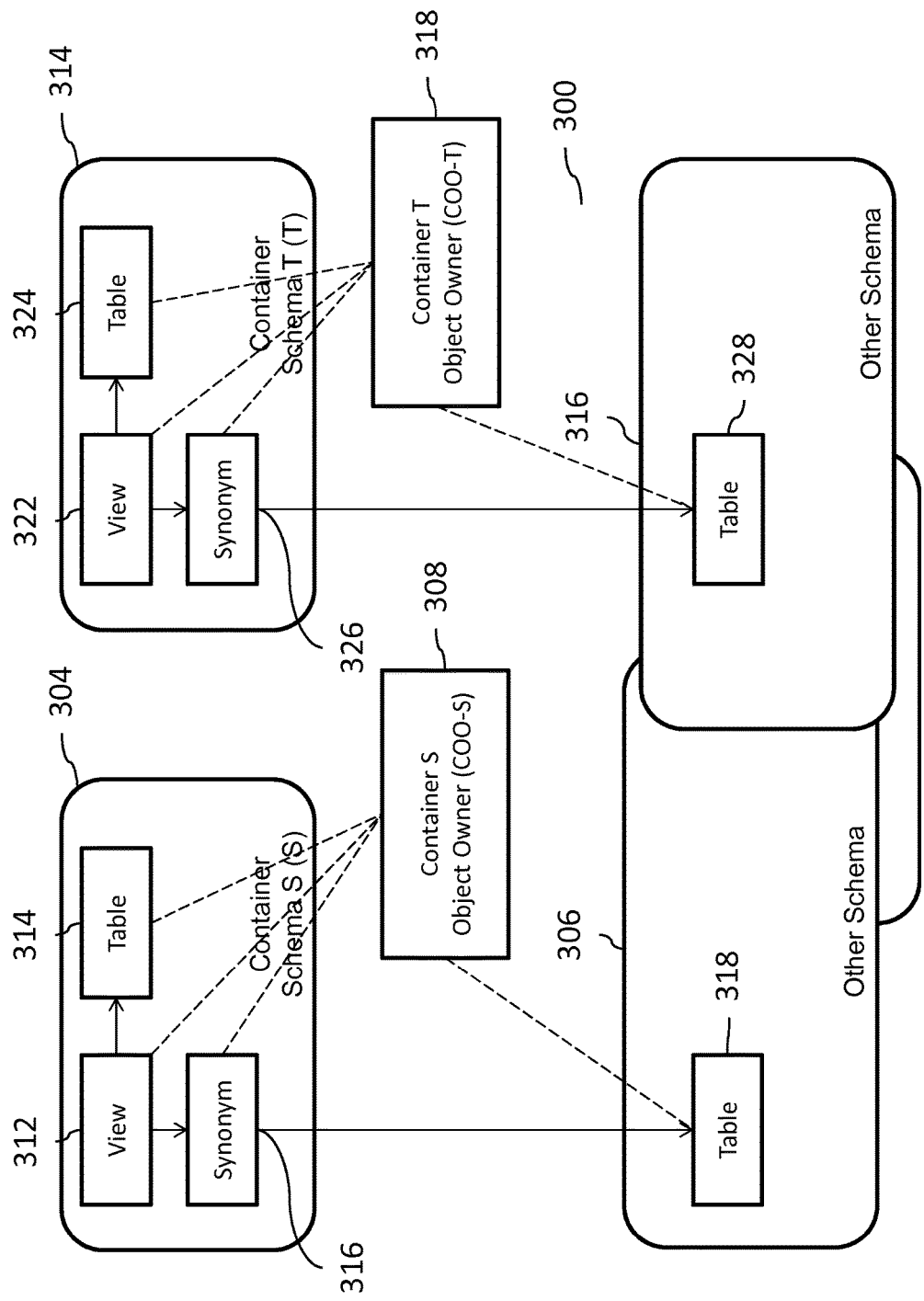
FIG. 3 illustrates exemplary multiple container system in a database schema, according to some implementations of the current subject matter.

FIG. 3 illustrates exemplary multiple container system 300 in a database schema, according to some implementations of the current subject matter. The system 300 can include container schemas 304 and 314 (e.g., container S schema ("S") and container T schema ("T"), respectively), other schemas 306, 316, container object owners 308, 318 (e.g., container S object owner ("COO-S") and container T object owner ("COO-T"), respectively). The container schema S 304 can include a view object 312, a table object 314, and a synonym object 316. The synonym 316 can link to a table 318 in an external schema 306. Likewise, the container schema T 314 can include a view object 322, a table object 324, and a synonym object 326. The synonym 326 can link to a table 328 in an external schema 316.

A. View

Referring back to FIG. 2, the view 212 can be associated with a view plugin that can transform a design-time view resource into a SQL view database object. In some exemplary implementations, the file format can use a data definition language ("DDL")-style syntax, which can be equivalent, for example, to the corresponding CREATE VIEW SQL syntax (without the "CREATE"). This can include support for column views of TYPE HIERARCHY if the query is provided as a SQL query. If the view selects from a synonym which points to an object inside another schema or different container or to an object inside the same container which is owned by a different user, then the container's object owner (i.e., COO-S 208) can be granted the required privileges on the target object, e.g., SELECT, UPDATE, INSERT, in order to access the object. For views, the object owner can also have WITH GRANT OPTION privileges (if the views are exposed to other users). If a view has to be secured via analytic privileges/structured privileges, then the view defined needs to contain the WITH STRUCTURED PRIVILEGE CHECK clause.

In some implementations, the deployment infrastructure can have at least one view plugin, which can include at least one of the following: a calculation view plugin, a projection view plugin, and/or any other view plugins. The calculation view plugin can transform a design-time calculation view description into a set of view database objects.

The projection view plugin can transform a design-time projection view resource into a projection view database object. A projection view configuration resource can contain a binding from the projection view to a target database, a target schema, and/or a target object (similar to synonyms, as discussed below). The definition of a projection view can include two design-time files: a projection view file (with an optional default configuration) and an explicit configuration of the projection view's target. The explicit configuration can be provided at deployment time, overriding an optional default configuration. An administrator can map object references according to the deployment context. In some exemplary implementations, the format of the projection view file can use a DDL-style syntax which can be equivalent to the corresponding CREATE PROJECTION VIEW SQL syntax (without the "CREATE"). The FROM clause of the PROJECTION VIEW definition can define the default configuration. A projection view configuration file can contain multiple configurations. If the "schema" of a target description is left out, then the projection view can point to a container-local object. In this case, the referenced object can be considered as a deployment dependency. If the projection view points to an object inside another schema or different container or to an object inside the same container, which is owned by a different user, then the container's object owner (e.g., COO-S 208 shown in FIG. 2) can be granted the required privileges on the target object, e.g., SELECT, UPDATE, INSERT, in order to access the object.

B. Table

The deployment infrastructure can also include a table 214 plugin that can transform a design-time table resource into a table database object. The file format can use a DDL-style syntax, which, in some exemplary implementations, can be equivalent to the corresponding CREATE TABLE SQL syntax (without the "CREATE"). Tables can have at least two types: ROW and COLUMN. A table can be self-contained. In some implementations, a table cannot reference another table.

The deployment infrastructure can include a virtual table plugin that can transform a design-time virtual table resource into a virtual table database object. The target database where the virtual table points to needs to be available via a database remote source. A definition of a virtual table can include two design-time files: a virtual table file (with an optional default configuration) and an explicit virtual table configuration that contains the binding from virtual table to remote source, target database, target schema, and/or target object. The explicit configuration can be provided at latest at deployment time, overriding the optional default configuration. An administrator can map object references according to the deployment context. In some exemplary implementations, the file format can use a DDL-style syntax which is equivalent to the corresponding CREATE VIRTUAL TABLE SQL syntax (without the "CREATE"). The container's object owner (e.g., COO-S 208 as shown in FIG. 2) can be granted the CREATE VIRTUAL TABLE ON REMOTE SOURCE privilege on the remote source in order to access the remote source.

C. Synonym

The synonym objects 216 or table links can allow referencing of schema-external objects. A typical example can include accessing database objects that are not brought into the system via HANA deployment infrastructure, e.g., database objects from an enterprise resource planning ("ERP") system and/or replicated objects. These objects can be easily accessed by defining synonyms. In most cases, fully qualified names of referenced database objects are not known during development but can depend on deployment decisions. Thus, the synonym can include two design-time files: a declaration (with an optional default configuration) and an explicit configuration of the synonym's target. The explicit configuration can be provided at deployment time and can override an optional default configuration. Hence, an administrator can map object references according to the deployment context.

The following code illustrates an exemplary synonym definition and configuration. Here, the synonym definitions use the content of the associated "target" objects as a default configuration:

```
{
    "<synonym 1>" : {
        "target": {
            "database" : "<the target database>", // optional
            "schema" : "<the target schema>", // optional
```

-continued

```
            "object" : "<the target object>"
        }
    },
    "<synonym 2>" : {
        "target": {
            "database" : "<the target database>", // optional
            "schema" : "<the target schema>", // optional
            "object" : "<the target object>"
        }
    },
    <...>
}
```

In some implementations, a synonym definition/configuration file can contain multiple definitions/configurations. If the "schema" and/or the "database" of a target description is/are left out, then the synonym can point to a container-local object. In this case, the referenced object can be considered as a deployment dependency. If the "schema"/"database" of a target description is defined, then the referenced target object can be considered as a non-development-infrastructure-managed runtime object and it is not considered during dependency management. If the synonym points to an object inside another schema or different container or to an object inside the same container which is owned by a different user, then the container's object owner (i.e., COO-S 208 as shown in FIG. 2) can be granted the required privileges on this target object, e.g. SELECT, UPDATE, INSERT, in order to access the object. If views or definer-mode procedures are built on top of synonyms, then the object owner can be granted privileges WITH GRANT OPTION (if the views are exposed to other users).

III. Deployment Infrastructure Application Programming Interface

To perform container management and deployment, the deployment infrastructure can use two kinds of APIs. One of the APIs can include a higher-level privileged container management API that can allow creation and/or deletion of schema-based containers. The other API can include a container-level deployment API that can allow applications and/or tools to deploy/undeploy artifacts within a container.

Figure 4:
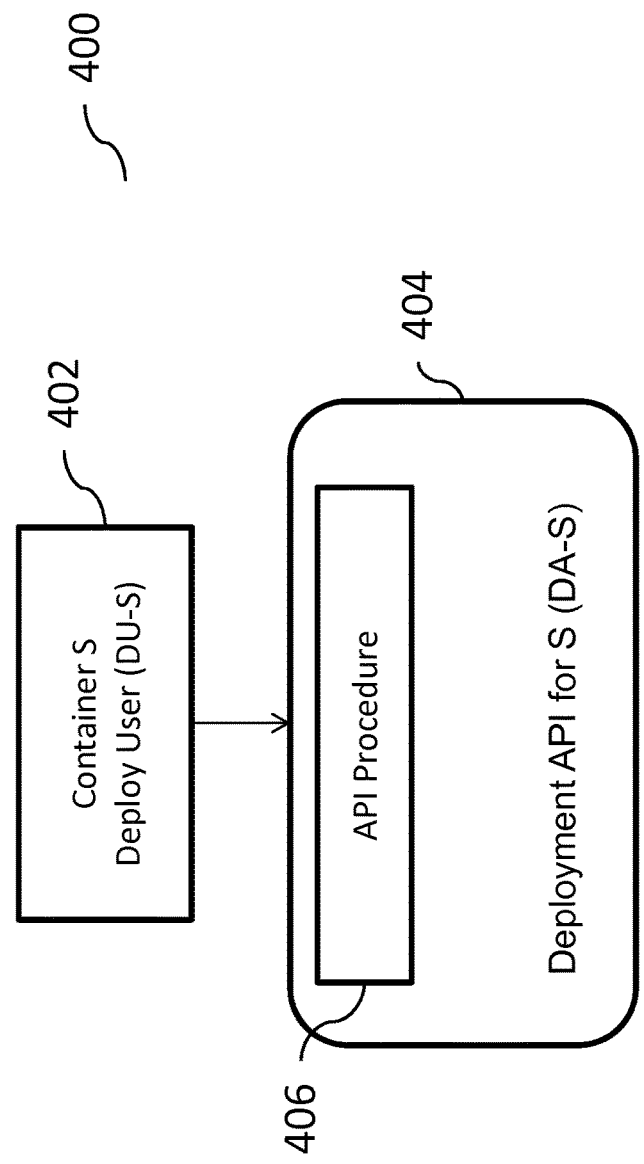
FIG. 4 illustrates an exemplary deployment API system, according to some implementations of the current subject matter.

FIG. 4 illustrates an exemplary deployment API system 400, according to some implementations of the current subject matter. The system 400 can include a container deployment user 402 (e.g., container S deploy user ("DU-S")) and a deployment infrastructure's deployment API 404 (e.g., deployment API for S ("DA-S") for a container (e.g., container 204, as shown in FIG. 2)). The deployment API 404 can include one or more API procedures 406. In some implementations, a deployment API can be paired to a container schema and can allow write/read design-time artifacts, trigger deploy/undeploy actions.

A. Container Management API

Figure 5:
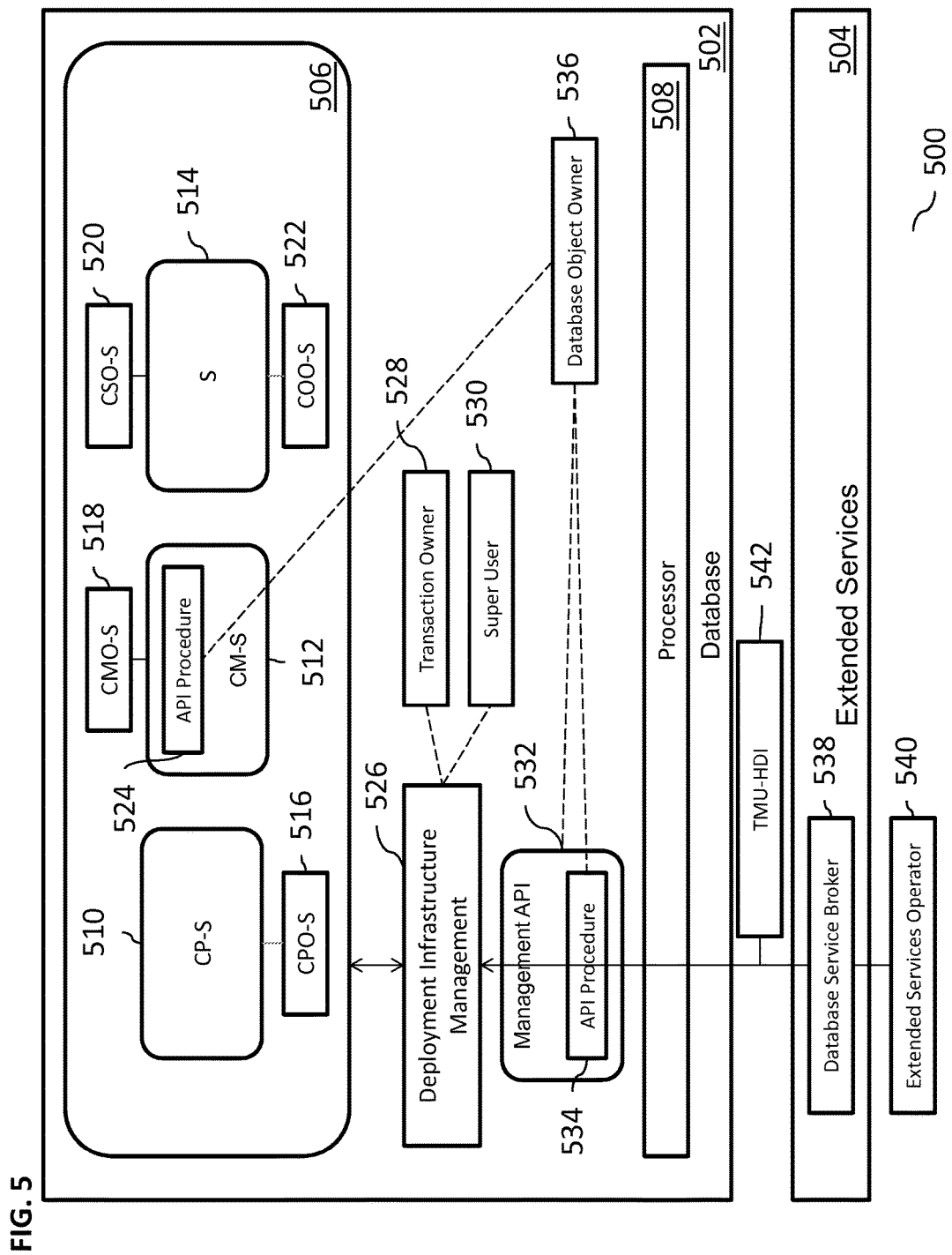
FIG. 5 illustrates an exemplary system for performing deployment infrastructure administration and container management, according to some implementations of the current subject matter.

FIG. 5 illustrates an exemplary system 500 for performing deployment infrastructure administration and container management, according to some implementations of the current subject matter. Container management can be performed using one or more APIs, which can include one or more database procedures that can be executed via a central database schema for the deployment infrastructure (DI): _SYS_DI. Some of the common procedures for performing container management can include creation/dropping of a container, granting/revoking of privileges on a container scheme (e.g., schema S), granting/revoking privileges on the container deployment API:

_SYS_DI.CREATE_CONTAINER (creation of a container);
_SYS_DI.DROP_CONTAINER (dropping a container);
_SYS_DI.GRANT_CONTAINER_SCHEMA_PRIVILEGE (granting container schema privilege);
_SYS_DI.REVOKE_CONTAINER_SCHEMA_PRIVILEGE (revoking container schema privilege);
_SYS_DI.GRANT_CONTAINER_API_PRIVILEGE (granting container API privilege);
_SYS_DI.REVOKE_CONTAINER_API_PRIVILEGE (revoking container API privilege).

An exemplary grant of privileges on the container schema S can include a call _SYS_DI.GRANT_CONTAINER_SCHEMA_PRIVILEGE ('S', 'SELECT', 'RUNTIME_USER_S'). An exemplary grant of a role on the container schema S can include a call of _SYS_DI.GRANT_CONTAINER_SCHEMA_ROLE ('S', 'A_ROLE_XYZ', 'SOME_USER'). An exemplary grant of a privilege (e.g., WRITE, READ, MAKE) on the container S deployment API can include calls _SYS_DI.GRANT_CONTAINER_API_PRIVILEGE ('S', 'WRITE', 'EXECUTE', 'DEPLOY_USER_S'); _SYS_DI.GRANT_CONTAINER_API_PRIVILEGE ('S', 'READ', 'EXECUTE', 'DEPLOY_USER_S'); and _SYS_DI.GRANT_CONTAINER_API_PRIVILEGE ('S', 'MAKE', 'EXECUTE', 'DEPLOY_USER_S'), respectively.

In some implementations, at installation time of the deployment infrastructure (together with underlying database appliance (e.g., HANA)), the management schema _SYS_DI, its content, and all internal deployment infrastructure system users can be created. Additionally, for bootstrapping of privileges, execute rights on these procedures (and/or select privileges on additional monitoring views, etc.) can be granted to the default administration user of the database with GRANT OPTION.

Referring to FIG. 5, the system 500 can include a database appliance 502 (e.g., HANA) communicatively coupled with extended services 504, which can be accessed by an extended services operator 540. The appliance 502 can include a container deployment infrastructure 506, a processor 508, a deployment infrastructure management component 526, and a management API 532. The container (e.g., container S) deployment infrastructure 506 can include deployment infrastructure plugin metadata for container S ("CP-S") 510 along with an associated container S plugin metadata owner(s) ("CPO-S") 516, a deployment infrastructure metadata and deployment API 512 for container S, including API procedure(s) 524, along with an associated container S metadata owner ("CMO-S") 518, and a deployment schema/container ("S") 514 along with container S schema owner ("CSO-S") 520 and container S object owner ("COO-S") 522 (which can have CREATE ANY privileges on the schema S). The container S can include one or more artifacts, objects, etc., as discussed above. The users 516, 518, 520, 522 are technical users. The deployment infrastructure management 526 can also be communicatively coupled with a deployment infrastructure transaction owner _SYS_DI_TO 528 and deployment infrastructure super user _STS_DI_SU 530 (which has all privileges). The database appliance 502 can also include a deployment infrastructure management API 532 having API procedure(s) 534 and a deployment infrastructure database object owner 536 that can be communicatively coupled with the management API 532, the API procedure(s) 534 as well as the API procedure(s) 524.

In some implementations, an administrator can create a deployment infrastructure technical management user ("TMU-HDI") 542 and grant execute rights on the above procedures (e.g., create container, drop container, grant privilege, etc.) to the management user 542. The database service broker 538 of the extended services 504 can use the management user 542 to create/alter/drop containers and/or grant/revoke privileges to/from users. More than one management user can exist in the system 500, and the privileges can be assigned to various roles and/or various roles can be assigned to users. Further, grant/revoke database procedures can be provided which can support user privileges on the _SYS_DI schema and/or a container's metadata schemata.

In some implementations, when creating a container, the system 500 can implement the following procedures. On creation of a container schema S, the deployment infrastructure can create the technical container schema owner CSO-S 520, the container schema S 514, the container object owner COO-S 522, the metadata and deployment API companion schema CM-S 512, and a set of plugin metadata companion schemata CP-S 510 with corresponding owner users CPO-S(s) 516. The metadata schema CM-S 512 can be used for storing file artifacts and/or keeping track of active files. The container-specific plugin metadata schemata CPO-S(s) 516 can be used for build-plugin-specific metadata that can be used during deployment.

In some implementations, technical container users (i.e., users 510, 516, 518, 522, 528, 530, 536) can only be used internally by the deployment infrastructure and can be created as restricted database users without an ability to log-on to the database. The users also own their corresponding objects in the deployment infrastructure.

In some implementations, the container object owner COO-S 522 can be used for creating database objects inside the container schema S 514. For example, the user 522 can have CREATE ANY privileges on the container schema S 514 and the _SYS_DI_OO_DEFAULTS role. This way, the database objects are owned by a system-internal technical user and are not bound to the lifetime of externally owned users which trigger the deployment of artifacts. Additionally, the deployed database objects do not inherit database privileges from the deploying users. The _SYS_DI_OO_D-EFAULTS role can give privileges on standard database objects, e.g., objects in SYS like SYS.DUMMY. The _SYS_DI_OO_DEFAULTS role can be a deployment infrastructure specific variant of the PUBLIC role (which can have a plurality of privileges) with a minimal set of object privileges that every container object owner can have.

In some implementations, the objects are not created via the container schema owner CSO-S 520 in order to avoid accidental deletion of objects inside the schema which were created by other users (e.g., by applications at runtime). The container object owner COO-S 522 does not have execute rights on the container's deployment API procedures. Thus, it might be not possible to deploy definer mode procedures which expose and/or use the deployment API (without explicitly granting these privileges to the container object owner COO-S). The container object owner COO-S 522 does not have any access to the metadata schemata.

Further, database privileges on external objects, e.g., SELECT privileges on ERP tables, which the container object owner COO-S 522 needs when creating database objects on top of these external objects (e.g. when deploying a view), can be granted to the object owner by the privilege owner (e.g., an administrator). If a view should be created by the container object owner COO-S 522, then the privileges on the external objects can be granted with GRANT OPTION.

The container schema owner CSO-S 520 can be used for dropping the container schema S 514 when the container is deleted. The container schema owner 520 can drop the schema including all contained database objects, although database objects from other users might exist inside the schema. The container schema owner CSO-S 520 can be used internally by deployment infrastructure for granting/revoking schema-level privileges to/from users.

In some implementations, once containers are created, they can be provided with a particular name in accordance with a container naming scheme. For example, container names can have a maximum size of 64 characters and can contain characters A to Z, numbers 0 to 9, and an underscore character "_", and/or any other characters.

The name of the container schema S 514, the name of the deployment API and metadata schema CM-S 512, and the name of the container object owner COO-S 522 can be visible to administrators and/or end-users. Thus, as shown in FIG. 5, they can be named "S", "S#DI", and "S#OO". All other internal users and internal schemata can use a prefix "_DI#S#" to allow to group and/or hide them in tools/queries/etc.

B. Container-Level Deployment API

Figure 6:
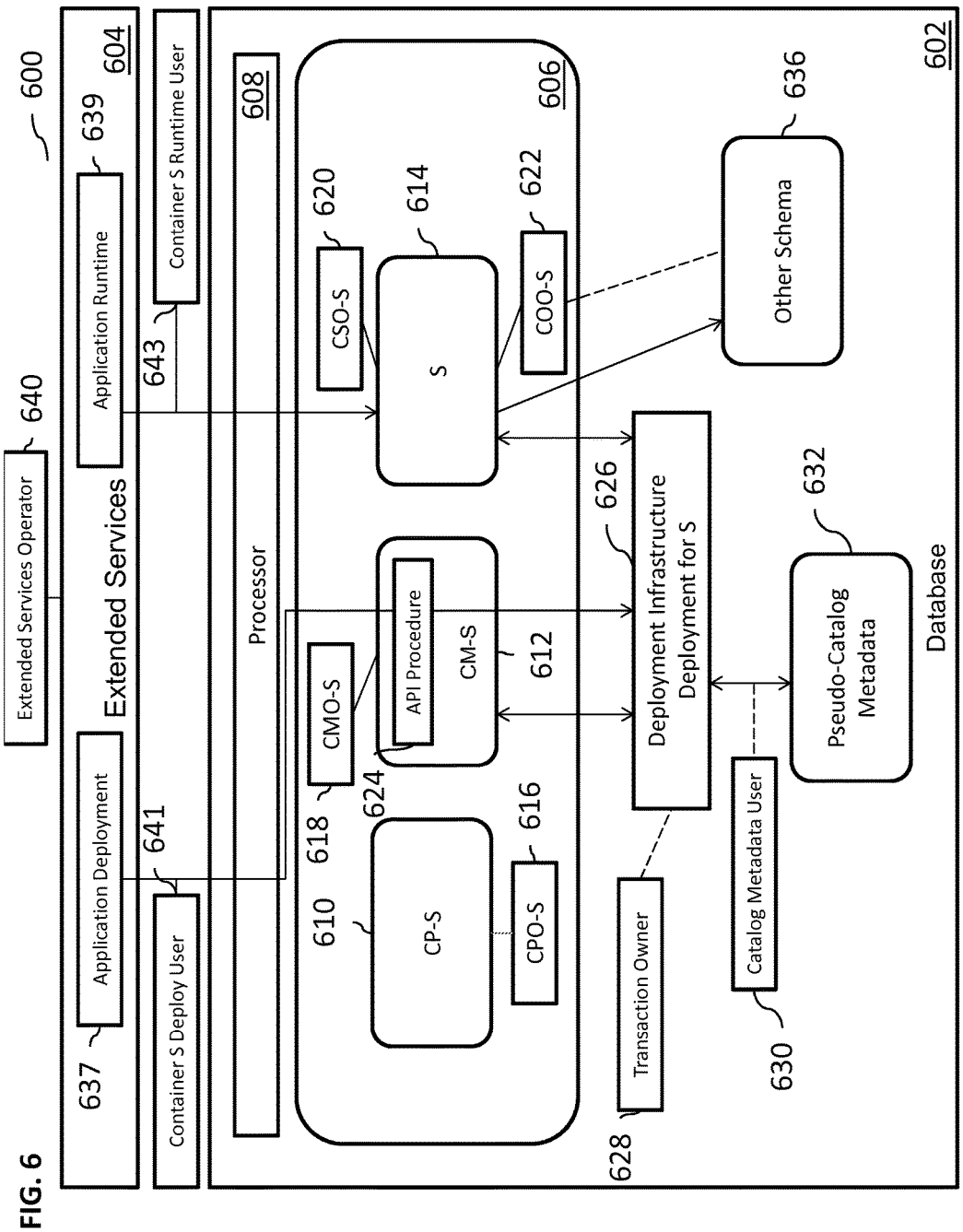
FIG. 6 illustrates an exemplary system having container-level deployment application program interfaces, according to some implementations of the current subject matter.

FIG. 6 illustrates an exemplary system 600 having container-level deployment application program interfaces, according to some implementations of the current subject matter. The system 600 can include a database 602 (e.g., HANA) communicatively coupled to extended services 604, which in turn, can be accessed by the extended services operator 640. The extended services user 640 can perform various functions, including, for example, install, upgrade, scale, etc. The extended services 604 can include an application deployment component 637 and an application runtime component 639, which can be used for deployment and runtime of an application, respectively.

The database 602 can include a processor (e.g., a HANA SQL processor) 608, container deployment infrastructure 606, in addition to deployment infrastructure for deployment of a container (e.g., container S) 626, a pseudo-catalog metadata (e.g., _SYS_DI_BIMC*) 632, and various other schema (e.g., other application schema, ERP schema, etc.) 636. The container (e.g., container S) deployment infrastructure 606 can include deployment infrastructure plugin metadata for container S ("CP-S") 610 along with an associated container S plugin metadata owner(s) ("CPO-S") 616, a deployment infrastructure metadata and deployment API 612 for container S, including API procedure(s) 624, along with an associated container S metadata owner ("CMO-S") 618, and a deployment schema/container ("S") 614 along with container S schema owner ("CSO-S") 620 and container S object owner ("COO-S") 622 (which can have CREATE ANY privileges on the schema S). In some implementations, the container object owner 622 can also receive access rights (e.g., explicitly granted by a third party) to other application schema component 636. The users 616, 618, 620, 622 can be technical users in accordance with the discussion above.

In some implementations, the application deployment component 637 can be associated with a container S deploy user ("DU-S"), which can generate various calls (e.g., CALL DA-S.WRITE ( . . . ), CALL DA-SMAKE( . . . ), etc.) to the processor 608. Similarly, the application runtime component 639 can be associated with a container S runtime user ("RU-S"), which execute various procedures (e.g., SELECT, INSERT, etc.) during runtime of an application, where the execution calls can be sent to the processor 608 for processing.

During deployment, calls issued by the application deployment component 637 can be passed on to the API procedure component 624 in the deployment infrastructure's metadata and deployment API component 612. The CM-S component 624 can further pass the call to the deployment infrastructure's deployment component 626. The deployment component 626 can exchange metadata updates and perform file staging updates using metadata object owner ("MOO-S") and/or container metadata schema owner ("MSO-S"), which can be other technical users in the system 600. The metadata can be container-specific metadata (e.g., design-time container ("DTC")) and can include information concerning design-time artifacts, data dependencies and/or build plugin metadata, as well as any other information. The deployment component 626 can also communicate with the deployment schema container component 614 to perform deployment/undeployment of schema/container using COO-S 622. The component 626 can further be controlled by the transaction owner component 628 (another technical user). In some implementations, the component 626 can also exchange pseudo-catalog metadata updates with the pseudo-catalog metadata component 632 using catalog metadata user 630 (e.g., using _SYS_DI_*CATALOG).

In some implementations, APIs for working with a specific container S 614 can be created as database procedures inside the container deployment API schema CM-S (i.e., "S#DI") 612. The procedures can include at least one of the following: file-system operations, make operations, grant/revoke operations. The file-system operation can include at least one of the following: CM-S.WRITE, CM-S.READ, CM-S.READ DEPLOYED, CM-S.LIST, CM-S.LIST DEPLOYED, CM-S.STATUS, and others. The make operations can include CM-S.MAKE and other procedures. The grant/revoke operations can include at least one of the following: CM-S. GRANT_API_PRIVILEGE, CM-S.REVOKE_API_PRIVILEGE, CM-S.GRANT_SCHEMA_PRIVILEGE, CM-S.REVOKE_SCHEMA_PRIVILEGE, CM-S.GRANT_SCHEMA_ROLE, CM-S.REVOKE_SCHEMA_ROLE, and others.

The above database procedures can be created as definer mode procedures and can be owned by the deployment infrastructure database object owner _SYS_DI. Their definition can include a delegation to a corresponding procedure in the central management schema _SYS_DI while binding the deployment schema. For example:

```
PROCEDURE CM-S.MAKE(a, b, c, d) ...
BEGIN
    --bind container name to 'S' and call private
    procedure_SYS_DI.MAKE_
    CALL_SYS_DI.MAKE_('S', a, b, c, d);
END
```

Execution rights for the container-level deployment APIs for schema S can be explicitly granted after container creation, using _SYS_DI.GRANT_CONTAINER_API_PRIVILEGE and/or with GRANT OPTION.

After creation of container S, the operator 640 can create at least the following users: the deploy user DU-S 641 and the runtime user RU-S 643. Then, the operator 640 can grant privileges on the container's deployment API to the deploy user DU-S 641 and privileges on the container schema S to the runtime user RU-S 643. Additional users and privileges can also be created. In some implementations, the deploy user and the runtime user can be a single entity, however, having separate deploy user DU-S 641 and runtime user RU-S 643 can simplify zero-downtime maintenance ("ZDM") upgrades. For example, during a ZDM upgrade, ZDM can set the runtime user RU-S 643 into a read-only mode by revoking privileges which can modify the data in the container schema S from the runtime user RU-S 643, while allowing the deploy user DU-S 641 to create/delete database objects as part of the upgrade.

In some implementations, a deployment user can be allowed to deploy everything in the given schema-based container. This can avoid a situation where the deployment user is limited to deploying a certain kind of artifact type and/or database objects that have a certain kind of name.

In some implementations, the current subject matter's deployment infrastructure can also provide various deployment privilege workarounds. This can be applicable in situation where not all database rights which are required during deployment into a container schema S currently exist as a database privilege, are grantable and/or restrictable on a schema-level (e.g., they exist only as a global privilege), and/or are contained in the schema-level CREATE ANY privilege. In order to work around these limitations without granting permanent system-wide privileges to the container object owner COO-S, the deployment infrastructure can implement a special deployment infrastructure internal super user _SYS_DI_SU user (e.g., super 530 as shown in FIG. 5), which can be created at installation time and who has all the required privileges (e.g., creation of users, creation of roles, etc.). When the deployment transaction begins, the super user 530 can temporarily grant one or more privileges to the container object owner COO-S, and when a transaction is going to be committed, these privileges can be revoked by the super user 530. This approach can be used whenever the container object owner must be the owner of the created database objects and can ensure that the container object owner COO-S has the required privileges at the point in time when the container object owner issues the CREATE statements towards the database. In some implementations, a catalog read access and/or dropping of database objects where only a system-wide privilege is available, can be performed directly via the super user 530. Further, insertion/deletion of data into/from catalog-like metadata tables which do not have schema-level privileges can be performed via dedicated "catalog" users (e.g., catalog metadata user 630 as shown in FIG. 6) and can be hidden behind corresponding APIs.

Exemplary container management APIs and container-level APIs can be found in the Appendix A. The container management APIs can be available via the central database schema _SYS_DI and the APIs for a specific container S inside the container's API schema S#DI. The APIs can include a set of database procedures, table types, and/or monitoring views.

IV. Technical Users

Figure 7:
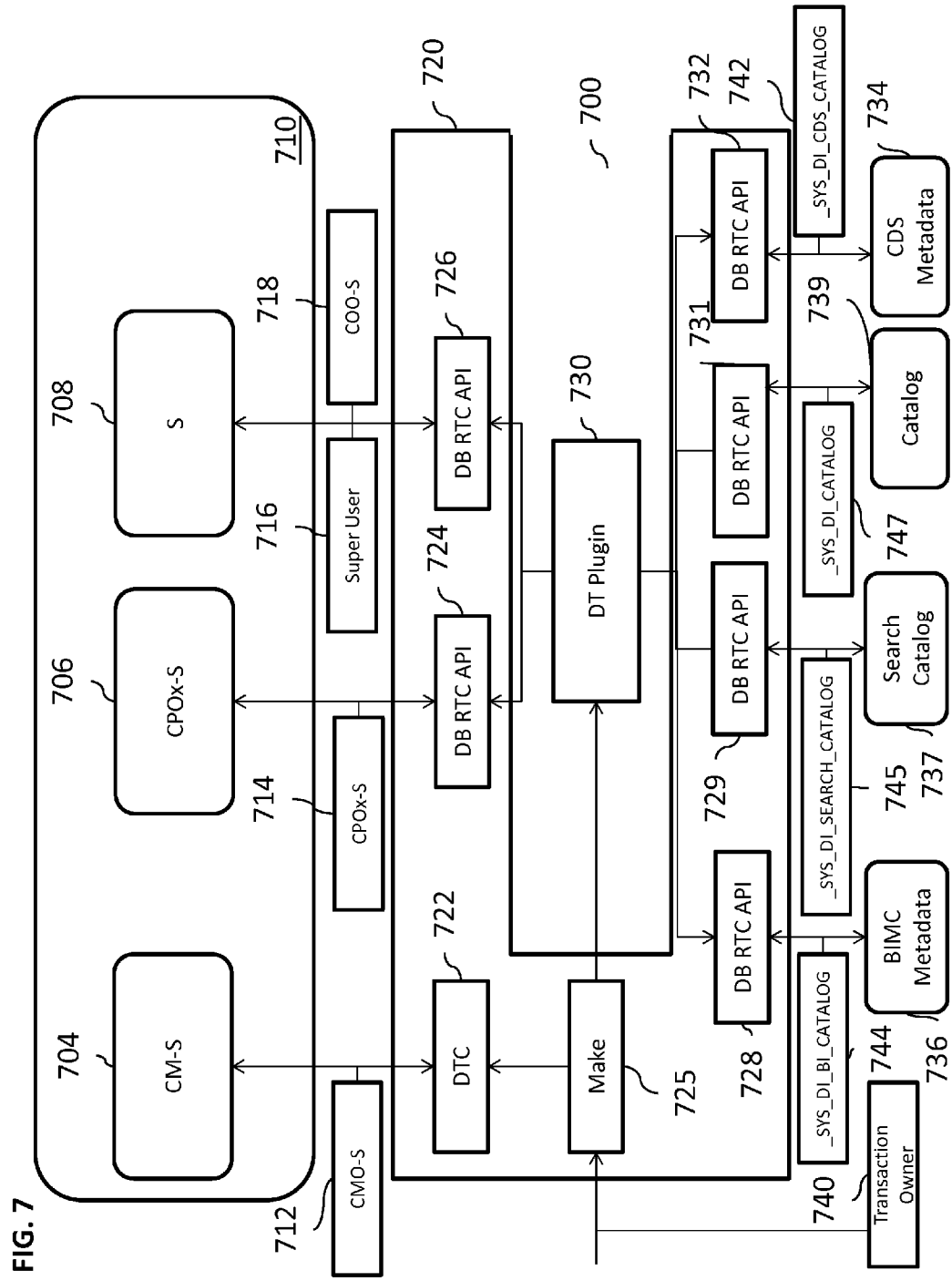
FIG. 7 illustrates an exemplary system that can use different technical users during deployment (such as during a single transaction), according to some implementations of the current subject matter.

FIG. 7 illustrates an exemplary system 700 that can use different technical users during deployment (such as during a single transaction), according to some implementations of the current subject matter. System 700 can include a deployment infrastructure component 710, a deployment infrastructure deployment component for a container S 720, and design-time ("DT") plugins 730. The component 710 can include a design-time container metadata for container S ("CM-S") 704, a plugin metadata storage for container S ("CPOx-S") 706, and deployment schema/container S ("S") 708. The deployment component 720 can include the design-time container ("DTC") API 722. In some implementations, the deployment process of a deployment container/schema S 708 can be orchestrated by a make component 725. The make component 725 can read design-time artifacts for deployment from the container metadata schema 704 via the design-time container API 722. In some implementations, the make component 725 can pass the design-time artifacts to the corresponding design-time plugins 730. The design-time plugins 730 can create database objects in the deployment schema/container S 708, e.g., tables, views, etc., via the database run-time container access ("DB RTC") API 726. In addition, the design-time plugins 730 can store metadata within the plugin metadata storage for container S 706. In some implementations, the design-time plugins 730 can also create business intelligence ("BI") metadata in the BI metadata catalog ("BIMC") 736. In some implementations, the design-time plugins 730 can also create core data services ("CDS") metadata in the CDS metadata catalog 734. In some implementations, the design-time plugins 730 can also create search metadata in the search metadata catalog 737.

As shown in FIG. 7, the system 700 can include one or more technical users that can perform various functions associated with the deployment infrastructure. A user _SYS_DI_BI_CATALOG 744 can be used for the BI metadata catalog (read/write access to _SYS_BI.BIMC_*), where DB RTC API 728 can be used. A user _SYS_DI_CDS_CATALOG 742 can be used for the CDS metadata catalog (read/write access to _SYS_RT.CDS_*), where DB RTC API 732 can be used. A user _SYS_DI_SEARCH_CATALOG 745 can be used for the search metadata catalog 737 (_SYS_RT.SEARCH_* and SYS_RT.ESH_*), where DB RTC API 729 can be used. The search metadata catalog can be used to store metadata for database-level search features. A user _SYS_DI_CATALOG 747 can be used for generic catalog queries, where DB RTC API 731 can be used. The database catalog user _SYS_DI_CATALOG 747 can be used for unfiltered generic queries on the database catalog, e.g., to retrieve metadata of tables, e.g., field names, field types, field sizes, etc.

In some implementations, the container object owner COO-S 718 can have extended privileges during the deployment process and thus, it should not be possible for build plugins to call arbitrary database procedures during deployment. Access to required database-internal database procedures can be provided via dedicated methods of the deployment infrastructure's database interface.

In some implementations, a common naming approach can be implemented by the deployment infrastructure. For example, .hdinamespace can contain a pattern that describes the naming scheme (e.g., a scheme "dot-and-double-colon, casesensitive" for "name.space::object", a "underscore, sql-style" for "name_space_object", or a "none" scheme for you-get-what-you-write). This pattern can be checked by the build plugins to ensure that the created database objects follow the rule of the pattern. The .hdinamespace files can be created on a folder-level, so it is possible to have a mixture of naming schemes inside a single container.

In some implementations, build plugins can be handled as pluggable components, e.g., each build plugin can live inside its own shared library and plugins can be loaded by the deployment infrastructure dynamically.

V. High Performance Analytic Appliance

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 8:
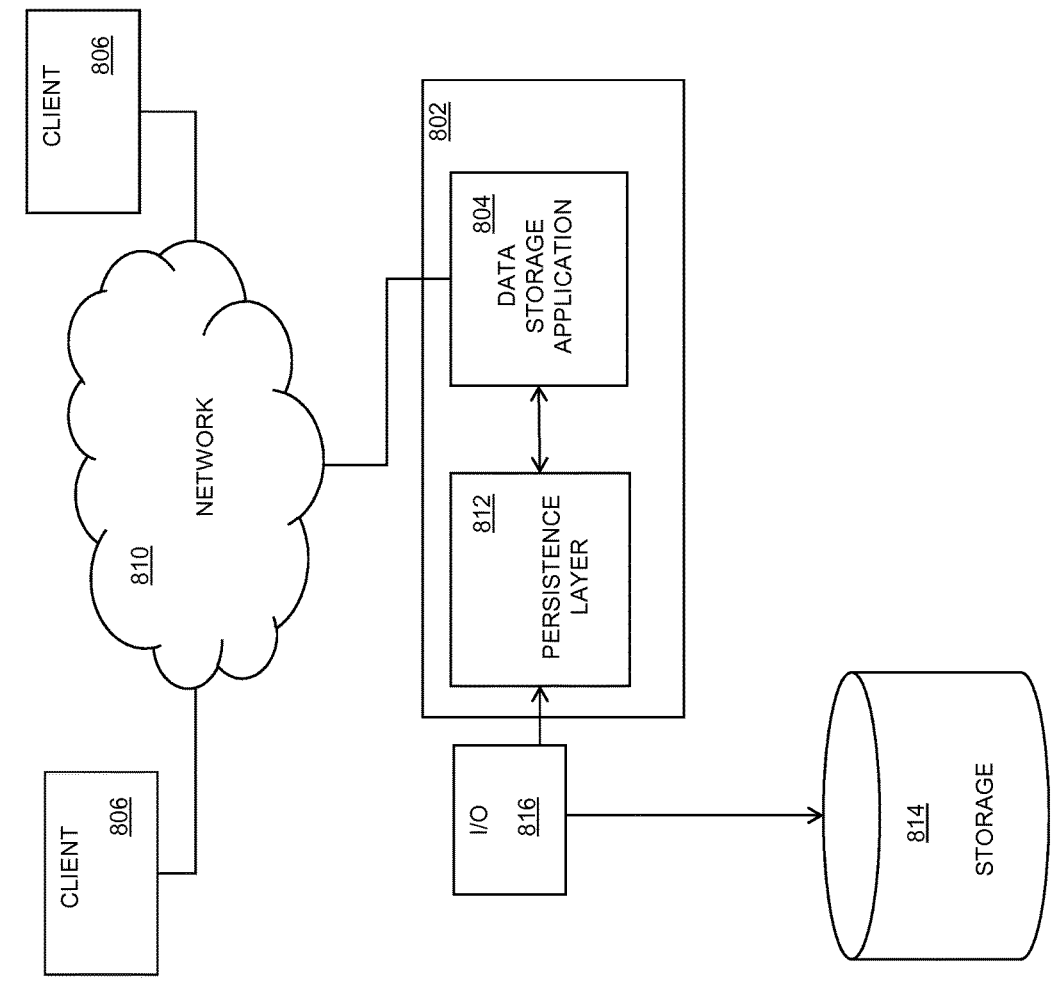
FIG. 8 is a diagram illustrating an exemplary system including a data storage application, according to some implementations of the current subject matter.

FIG. 8 illustrates an exemplary system 800 in which a computing system 802, which can include one or more programmable processors that can be collocated, linked over one or more networks, etc., executes one or more modules, software components, or the like of a data storage application 804, according to some implementations of the current subject matter. The data storage application 804 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 802 as well as to remote users accessing the computing system 802 from one or more client machines 806 over a network connection 810. One or more user interface screens produced by the one or more first modules can be displayed to a user, either via a local display or via a display associated with one of the client machines 806. Data units of the data storage application 804 can be transiently stored in a persistence layer 812 (e.g., a page buffer or other type of temporary persistency layer), which can write the data, in the form of storage pages, to one or more storages 814, for example via an input/output component 816. The one or more storages 814 can include one or more physical storage media or devices (e.g. hard disk drives, persistent flash memory, random access memory, optical media, magnetic media, and the like) configured for writing data for longer term storage. It should be noted that the storage 814 and the input/output component 816 can be included in the computing system 802 despite their being shown as external to the computing system 802 in FIG. 8.

Data retained at the longer term storage 814 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 9:
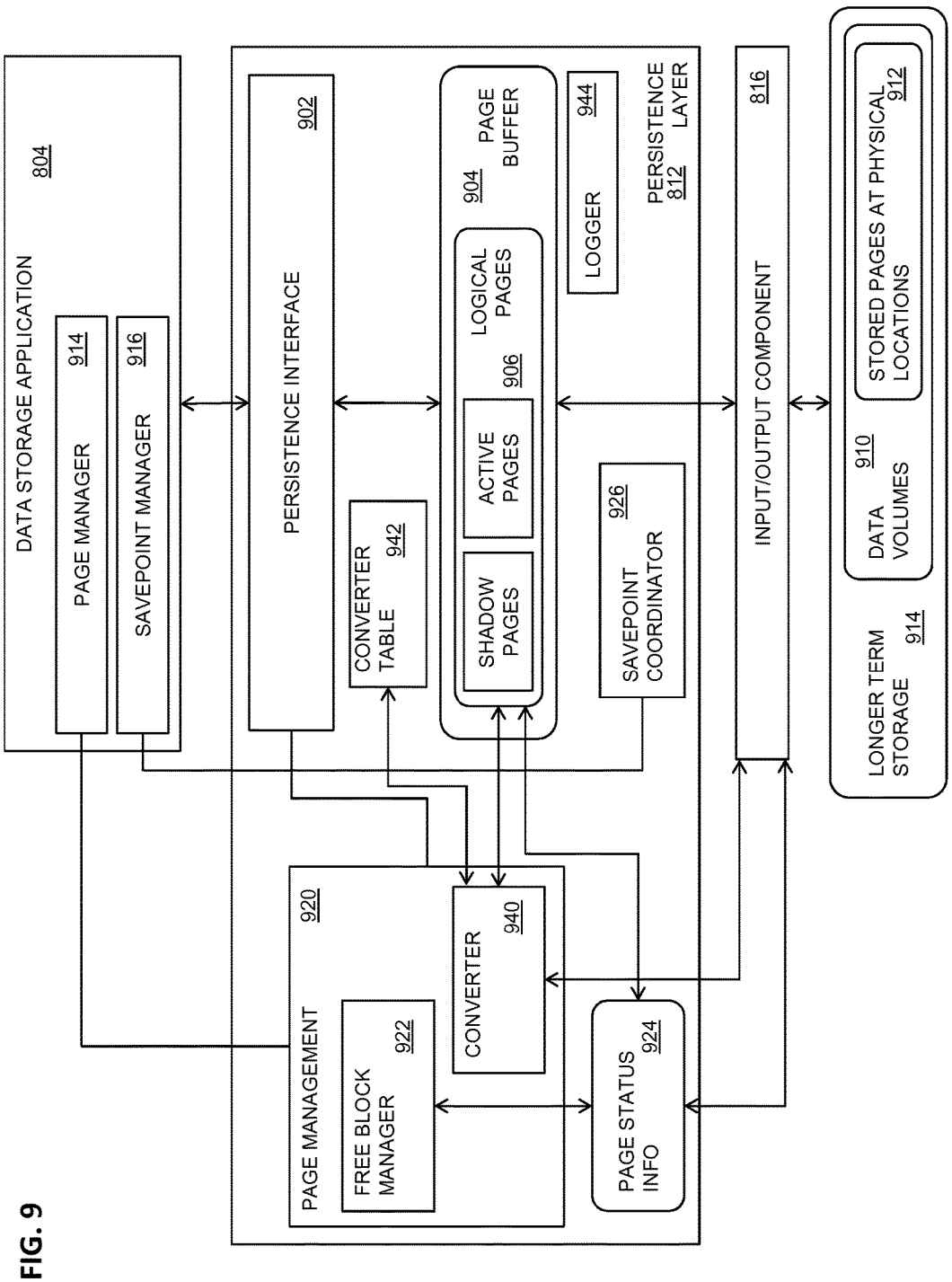
FIG. 9 is a diagram illustrating details of the system of FIG. 8.

FIG. 9 illustrates exemplary software architecture 900, according to some implementations of the current subject matter. A data storage application 804, which can be implemented in one or more of hardware and software, can include one or more of a database application, a network-attached storage system, or the like. According to at least some implementations of the current subject matter, such a data storage application 804 can include or otherwise interface with a persistence layer 812 or other type of memory buffer, for example via a persistence interface 902. A page buffer 904 within the persistence layer 812 can store one or more logical pages 906, and optionally can include shadow pages, active pages, and the like. The logical pages 906 retained in the persistence layer 812 can be written to a storage (e.g. a longer term storage, etc.) 814 via an input/output component 816, which can be a software module, a sub-system implemented in one or more of software and hardware, or the like. The storage 814 can include one or more data volumes 910 where stored pages 912 are allocated at physical memory blocks.

In some implementations, the data storage application 804 can include or be otherwise in communication with a page manager 914 and/or a savepoint manager 916. The page manager 914 can communicate with a page management module 920 at the persistence layer 812 that can include a free block manager 922 that monitors page status information 924, for example the status of physical pages within the storage 814 and logical pages in the persistence layer 812 (and optionally in the page buffer 904). The savepoint manager 916 can communicate with a savepoint coordinator 926 at the persistence layer 812 to handle savepoints, which are used to create a consistent persistent state of the database for restart after a possible crash.

In some implementations of a data storage application 804, the page management module of the persistence layer 812 can implement shadow paging. The free block manager 922 within the page management module 920 can maintain the status of physical pages. The page buffer 904 can include a fixed page status buffer that operates as discussed herein. A converter component 940, which can be part of or in communication with the page management module 920, can be responsible for mapping between logical and physical pages written to the storage 814. The converter 940 can maintain the current mapping of logical pages to the corresponding physical pages in a converter table 942. The converter 940 can maintain a current mapping of logical pages 906 to the corresponding physical pages in one or more converter tables 942. When a logical page 906 is read from storage 814, the storage page to be loaded can be looked up from the one or more converter tables 942 using the converter 940. When a logical page is written to storage 814 the first time after a savepoint, a new free physical page is assigned to the logical page. The free block manager 922 marks the new physical page as "used" and the new mapping is stored in the one or more converter tables 942.

The persistence layer 812 can ensure that changes made in the data storage application 804 are durable and that the data storage application 804 can be restored to a most recent committed state after a restart. Writing data to the storage 814 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 944 can also be included to store the changes made to the data of the data storage application in a linear log. The logger component 944 can be used during recovery to replay operations since a last savepoint to ensure that all operations are applied to the data and that transactions with a logged "commit" record are committed before rolling back still-open transactions at the end of a recovery process.

To ensure that committed changes are not lost, redo log information can be written by the logger component 944 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 812 can use a combination of undo log entries (from one or more logs) and shadow paging.

The persistence interface 902 can handle read and write requests of stores (e.g., in-memory stores, etc.). The persistence interface 902 can also provide write methods for writing data both with logging and without logging. If the logged write operations are used, the persistence interface 902 invokes the logger 944. In addition, the logger 944 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 944. For an entry of type "update", for example, this would be the identification of the affected record and the after image of the modified data.

When the data application 804 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 944 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 944 can write a database log (or simply referred to herein as a "log") sequentially into a memory buffer in natural order (e.g., sequential order, etc.). If several physical hard disks/storage devices are used to store log data, several log partitions can be defined. Thereafter, the logger 944 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 804 can use shadow paging so that the savepoint manager 916 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 10:
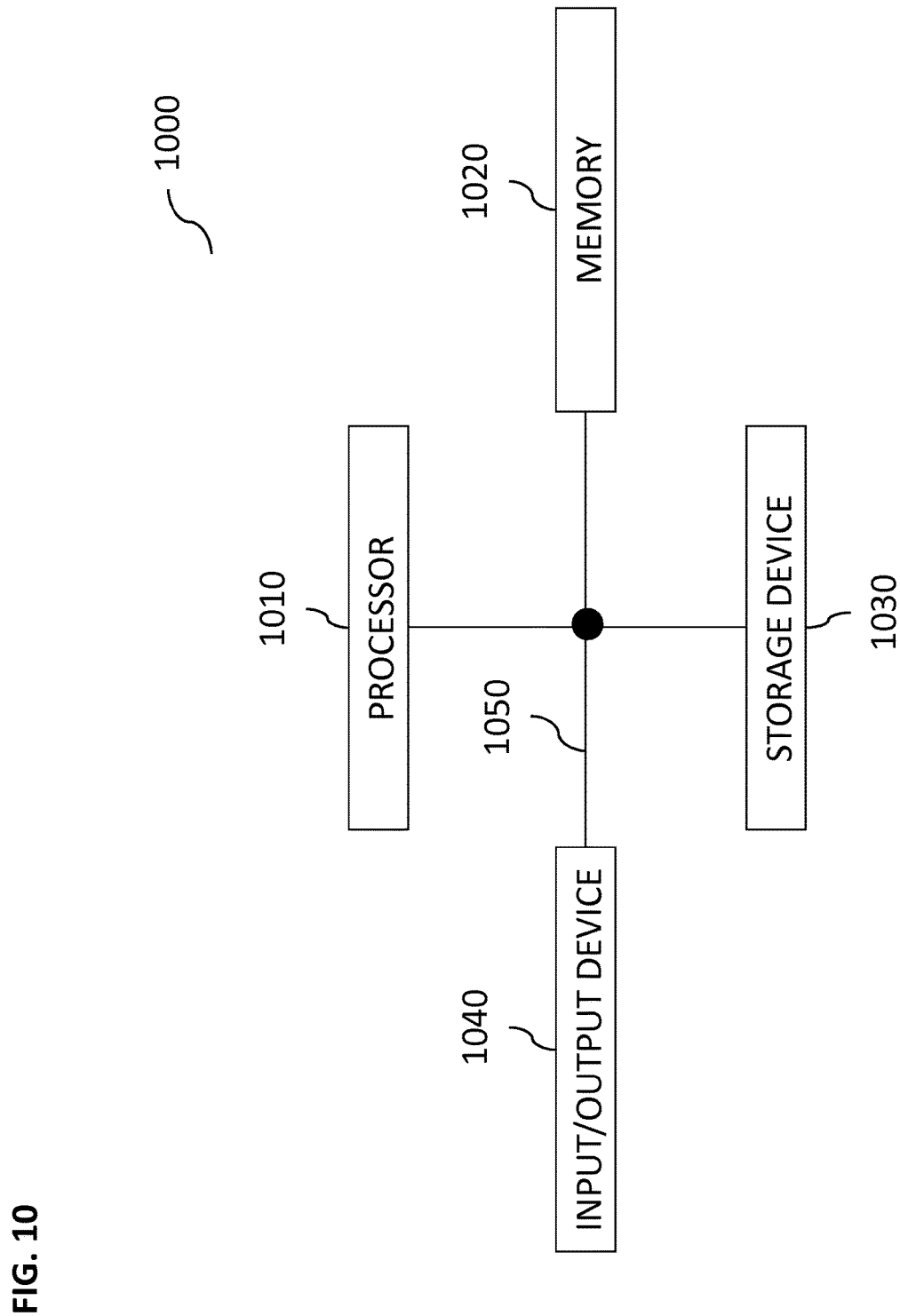
FIG. 10 illustrates an exemplary system, according to some implementations of the current subject matter.

In some implementations, the current subject matter can be configured to be implemented in a system 1000, as shown in FIG. 10. The system 1000 can include a processor 1010, a memory 1020, a storage device 1030, and an input/output device 1040. Each of the components 1010, 1020, 1030 and 1040 can be interconnected using a system bus 1050. The processor 1010 can be configured to process instructions for execution within the system 1000. In some implementations, the processor 1010 can be a single-threaded processor. In alternate implementations, the processor 1010 can be a multi-threaded processor. The processor 1010 can be further configured to process instructions stored in the memory 1020 or on the storage device 1030, including receiving or sending information through the input/output device 1040. The memory 1020 can store information within the system 1000. In some implementations, the memory 1020 can be a computer-readable medium. In alternate implementations, the memory 1020 can be a volatile memory unit. In yet some implementations, the memory 1020 can be a non-volatile memory unit. The storage device 1030 can be capable of providing mass storage for the system 1000. In some implementations, the storage device 1030 can be a computer-readable medium. In alternate implementations, the storage device 1030 can be a floppy disk device, a hard disk device, an optical disk device, a tape device, non-volatile solid state memory, or any other type of storage device. The input/output device 1040 can be configured to provide input/output operations for the system 1000. In some implementations, the input/output device 1040 can include a keyboard and/or pointing device. In alternate implementations, the input/output device 1040 can include a display unit for displaying graphical user interfaces.

Figure 11:
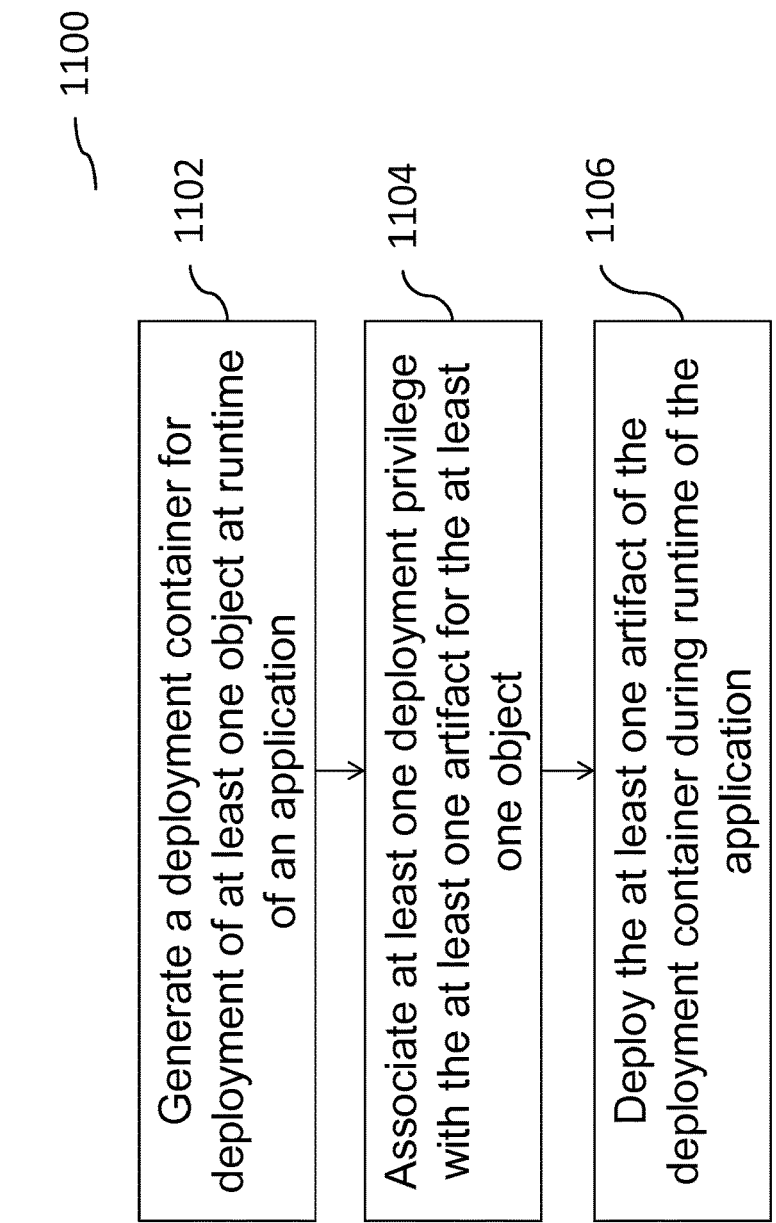
FIG. 11 illustrates an exemplary method, according to some implementations of the current subject matter.

FIG. 11 illustrates an exemplary method 1100, according to some implementations of the current subject matter. At 1102, a deployment container can be generated for deployment of at least one object at runtime of an application. The container can be generated using a deployment infrastructure of a database system (as shown and discussed in connection with FIG. 1 above). The container can include at least one artifact for the object and can further include a container schema indicative of at least one dependency associated with at least one object. At 1104, at least one deployment privilege can be associated with the artifact for the object. The deployment privilege can be determined based on the container schema. As discussed above, a particular technical user can be granted a deployment privilege, which can include creation, deletion, and alternation of objects. At 1106, based on the associated deployment schema, the artifact of the deployment container can be deployed during runtime of the application.

In some implementations, the current subject matter can include one or more of the following optional features. The artifact can represent a target state of the object during runtime of the application. The artifact can also specify a view definition of the object in the target state. The artifact can include at least one of the following: a data definition language artifact, a synonym, a table, a view, a role, a privilege, a configuration, a core data service, a function, an index, and any combination thereof.

In some implementations, the method can include repeatedly deploying the artifact and/or the container during runtime of the application. The deployment can include at least one of the following: creating the object during runtime of the application, modifying the object during runtime of the application, and deleting the object during runtime of the application.

In some implementations, the artifact can provide a link to at least another artifact of at least another deployment container. Deployment of the artifact can be independent of another artifact in another deployment container. Deployment of the artifact during runtime of the application can be performed based on a deployment order specified by the dependency.

In some implementations, the method can include isolating the container based on at least one of the following: a database schema, a metadata schema, a database privilege, a technical user associated with the container, a technical user associated with a container schema, and any combination thereof.

In some implementations, the artifact can be a synonym including a link to an object contained within an isolated container and the method can also include requesting an access privilege to the object contained within the isolated container, and performing the deploying based on the access privilege received in response to the requesting.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

APPENDIX A

-- begin:ignore

DROP SCHEMA SYS_DI CASCADE;

CREATE SCHEMA SYS_DI;

DROP SCHEMA S#DI CASCADE;

CREATE SCHEMA S#DI;

-- end:ignore

----------------------------------------------------------

--

-- Table types

--

----------------------------------------------------------

-- SYS_DI.TT_PARAMETERS

--

-- Table type for key-value-style parameters.

--

CREATE TYPE SYS_DI.TT_PARAMETERS

AS TABLE (

KEY                NVARCHAR(256),

VALUE              NVARCHAR(256)

);

-- SYS_DI.TT_MESSAGES

--

-- Table type for generic result message data structure.

--

CREATE TYPE SYS_DI.TT_MESSAGES

AS TABLE (

REQUEST_ID         BIGINT,

ROW_ID             BIGINT,

```
LEVEL               INT,
TYPE                NVARCHAR(32),
LIBRARY_ID          NVARCHAR(256),
PLUGIN_ID           NVARCHAR(256),
PATH                NVARCHAR(511),
SEVERITY            NVARCHAR(16),
MESSAGE_CODE        BIGINT,
MESSAGE             NVARCHAR(5000),
LOCATION            NVARCHAR(64),
LOCATION_PATH       NVARCHAR(256),
TIMESTAMP_UTC       TIMESTAMP
);
-- SYS_DI.TT_CONTAINER_SCHEMA_PRIVILEGES
--
-- Table type for schema-level privileges.
--
CREATE TYPE SYS_DI.TT_CONTAINER_SCHEMA_PRIVILEGES
AS TABLE
(
CONTAINER_NAME      NVARCHAR(256),
PRIVILEGE_NAME      NVARCHAR(256),
USER_NAME           NVARCHAR(256)
);
-- SYS_DI.TT_SCHEMA_PRIVILEGES
--
-- Table type for schema-level privileges.
--
CREATE TYPE SYS_DI.TT_SCHEMA_PRIVILEGES
AS TABLE
(
PRIVILEGE_NAME      NVARCHAR(256),
```

```
USER_NAME              NVARCHAR(256)
);
-- SYS_DI.TT_CONTAINER_SCHEMA_ROLES
--
-- Table type for schema-level roles.
--
CREATE TYPE SYS_DI.TT_CONTAINER_SCHEMA_ROLES
AS TABLE
(
CONTAINER_NAME         NVARCHAR(256),
ROLE_NAME              NVARCHAR(256),
USER_NAME              NVARCHAR(256)
);
-- SYS_DI.TT_SCHEMA_ROLES
--
-- Table type for schema-level roles.
--
CREATE TYPE SYS_DI.TT_SCHEMA_ROLES
AS TABLE
(
ROLE_NAME              NVARCHAR(256),
USER_NAME              NVARCHAR(256)
);
-- SYS_DI.TT_CONTAINER_API_PRIVILEGES
--
-- Table type for object-level privileges.
--
CREATE TYPE SYS_DI.TT_CONTAINER_API_PRIVILEGES
AS TABLE
(
CONTAINER_NAME         NVARCHAR(256),
```

```
PRIVILEGE_NAME          NVARCHAR(256),
OBJECT_NAME             NVARCHAR(256),
USER_NAME               NVARCHAR(256)
);
```
-- SYS_DI.TT_API_PRIVILEGES
--
-- Table type for object-level privileges.
--
```
CREATE TYPE SYS_DI.TT_API_PRIVILEGES
AS TABLE
(
PRIVILEGE_NAME          NVARCHAR(256),
OBJECT_NAME             NVARCHAR(256),
USER_NAME               NVARCHAR(256)
);
```
-- SYS_DI.TT_FILESFOLDERS
--
-- Table type for files/folders.
--
```
CREATE TYPE SYS_DI.TT_FILESFOLDERS
AS TABLE
(
PATH                    NVARCHAR(511)
);
```
-- SYS_DI.TT_FILESFOLDERS_CONTENT
--
-- Table type for files/folders and content.
--
```
CREATE TYPE SYS_DI.TT_FILESFOLDERS_CONTENT
AS TABLE
(
```

```
PATH                          NVARCHAR(511),
CONTENT                       BLOB
);
-- SYS_DI.TT_FILESFOLDERS_METADATA
--
-- Table type for files/folders metadata.
--
CREATE TYPE SYS_DI.TT_FILESFOLDERS_METADATA
AS TABLE
(
PATH                          NVARCHAR(511),
CREATE_USER_NAME              NVARCHAR(256),
CREATE_AUSER_NAME             NVARCHAR(256),
CREATE_TIMESTAMP_UTC          TIMESTAMP,
MODIFICATION_USER_NAME        NVARCHAR(256),
MODIFICATION_AUSER_NAME       NVARCHAR(256),
MODIFICATION_TIMESTAMP_UTC    TIMESTAMP,
SIZE                          BIGINT,
SHA256                        NVARCHAR(256)
);
-- SYS_DI.TT_FILESFOLDERS_METADATA_CONTENT
--
-- Table type for files/folders metadata and content.
--
CREATE TYPE SYS_DI.TT_FILESFOLDERS_METADATA_CONTENT
AS TABLE
(
PATH                          NVARCHAR(511),
CREATE_USER_NAME              NVARCHAR(256),
CREATE_AUSER_NAME             NVARCHAR(256),
CREATE_TIMESTAMP_UTC          TIMESTAMP,
```

```
MODIFICATION_USER_NAME          NVARCHAR(256),
MODIFICATION_AUSER_NAME         NVARCHAR(256),
MODIFICATION_TIMESTAMP_UTC      TIMESTAMP,
SIZE                            BIGINT,
SHA256                          NVARCHAR(64),
CONTENT                         BLOB
);
-- SYS_DI.TT_FILESFOLDERS_STATUS
--
-- Table type for the status of files/folders.
--
CREATE TYPE SYS_DI.TT_FILESFOLDERS_STATUS
AS TABLE
(
PATH                            NVARCHAR(511),
STATUS                          NVARCHAR(1),
SHA256                          NVARCHAR(64),
SHA256_DEPLOYED                 NVARCHAR(64)
);
-- SYS_DI.TT_FILESFOLDERS_PARAMETERS
--
-- Table type for files/folders.
--
CREATE TYPE SYS_DI.TT_FILESFOLDERS_PARAMETERS
AS TABLE
(
PATH                            NVARCHAR(511),
KEY                             NVARCHAR(256),
VALUE                           NVARCHAR(256)
);
-- SYS_DI.TT_LIBRARIES
```

--
-- Table type for library configuration.
--
CREATE TYPE SYS_DI.TT_LIBRARIES
AS TABLE
(
ACTION                          NVARCHAR(8),
LIBRARY_NAME                    NVARCHAR(256),
PRIMARY KEY ( LIBRARY_NAME )
);
-- begin:ignore
CREATE TABLE SYS_DI.T_KEY_VALUE_PARAMETERS_EMPTY
LIKE SYS_DI.TT_PARAMETERS;
CREATE TABLE SYS_DI.T_RESULT_MESSAGES_EMPTY
LIKE SYS_DI.TT_MESSAGES;
CREATE TABLE SYS_DI.T_FILESFOLDERS_EMPTY
LIKE SYS_DI.TT_FILESFOLDERS;
CREATE TABLE SYS_DI.T_FILESFOLDERS_CONTENT_EMPTY
LIKE SYS_DI.TT_FILESFOLDERS_CONTENT;
CREATE TABLE SYS_DI.T_FILESFOLDERS_METADATA_EMPTY
LIKE SYS_DI.TT_FILESFOLDERS_METADATA;
CREATE TABLE SYS_DI.T_FILESFOLDERS_METADATA_CONTENT_EMPTY
LIKE SYS_DI.TT_FILESFOLDERS_METADATA_CONTENT;
CREATE TABLE SYS_DI.T_FILESFOLDERS_STATUS_EMPTY
LIKE SYS_DI.TT_FILESFOLDERS_STATUS;
-- end:ignore
----------------------------------------------------------
--
-- Sequences
--
----------------------------------------------------------

-- SYS_DI.S_REQUEST_ID_

--

-- Sequence for request-ids.

--

CREATE SEQUENCE SYS_DI.S_REQUEST_ID_

MINVALUE 1

CYCLE;

---------------------------------------------------------

--

-- Tables

--

---------------------------------------------------------

-- SYS_DI.T_DEFAULT_LIBRARIES

--

-- Table with the default set of libraries for a container.

--

CREATE COLUMN TABLE SYS_DI.T_DEFAULT_LIBRARIES

LIKE _SYS_DI.TT_LIBRARIES;

---------------------------------------------------------

--

-- Procedures

--

---------------------------------------------------------

-- SYS_DI.CREATE_CONTAINER

--

-- Creates a container with the given container-id.

--

CREATE PROCEDURE SYS_DI.CREATE_CONTAINER (

IN     CONTAINER_NAME     NVARCHAR(256),

IN     PARAMETERS     SYS_DI.TT_PARAMETERS,

```
  OUT  REQUEST_ID           BIGINT,
  OUT  RESULT_MESSAGES      SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.DROP_CONTAINER
--
-- Drops the container with the given container-id,
-- incl. all corresponding technical users, schemata, tables, etc.
--
CREATE PROCEDURE SYS_DI.DROP_CONTAINER
(
  IN   CONTAINER_NAME       NVARCHAR(256),
  IN   PARAMETERS           SYS_DI.TT_PARAMETERS,
  OUT  REQUEST_ID           BIGINT,
  OUT  RESULT_MESSAGES      SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.CONFIGURE_LIBRARIES
--
-- (Re)configures the set of plugin libraries which are installed in the given container.
--
CREATE PROCEDURE SYS_DI.CONFIGURE_LIBRARIES
(
  IN   CONTAINER_NAME       NVARCHAR(256),
  IN   LIBRARIES            SYS_DI.TT_LIBRARIES,
```

```
IN      PARAMETERS           SYS_DI.TT_PARAMETERS,
OUT     REQUEST_ID           BIGINT,
OUT     RESULT_MESSAGES      SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.GRANT_CONTAINER_SCHEMA_PRIVILEGE
--
-- Grants the given privilege on the container's target schema
-- to the given user.
--
CREATE PROCEDURE SYS_DI.GRANT_CONTAINER_SCHEMA_PRIVILEGE
(
IN      CONTAINER_NAME       NVARCHAR(256),
IN      PRIVILEGE_NAME       NVARCHAR(256),
IN      USER_NAME            NVARCHAR(256),
OUT     REQUEST_ID           BIGINT,
OUT     RESULT_MESSAGES      SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.GRANT_CONTAINER_SCHEMA_PRIVILEGES
--
-- Batch variant of the former procedure.
--
CREATE PROCEDURE SYS_DI.GRANT_CONTAINER_SCHEMA_PRIVILEGES
(
```

```
IN    PRIVILEGES         SYS_DI.TT_CONTAINER_SCHEMA_PRIVILEGES,
OUT   REQUEST_ID         BIGINT,
OUT   RESULT_MESSAGES SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.GRANT_CONTAINER_SCHEMA_PRIVILEGE_WITH_GRANT_OPTION
--
-- Grants the given privilege on the container's target schema
-- to the given user with grant option.
--
CREATE PROCEDURE
SYS_DI.GRANT_CONTAINER_SCHEMA_PRIVILEGE_WITH_GRANT_OPTION
(
IN    CONTAINER_NAME     NVARCHAR(256),
IN    PRIVILEGE_NAME     NVARCHAR(256),
IN    USER_NAME          NVARCHAR(256),
OUT   REQUEST_ID         BIGINT,
OUT   RESULT_MESSAGES    SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.GRANT_CONTAINER_SCHEMA_PRIVILEGES_WITH_GRANT_OPTION
--
-- Batch variant of the former procedure.
--
```

```
CREATE PROCEDURE
SYS_DI.GRANT_CONTAINER_SCHEMA_PRIVILEGES_WITH_GRANT_OPTION
(
IN     PRIVILEGES       SYS_DI.TT_CONTAINER_SCHEMA_PRIVILEGES,
OUT    REQUEST_ID       BIGINT,
OUT    RESULT_MESSAGES SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.REVOKE_CONTAINER_SCHEMA_PRIVILEGE
--
-- Revokes the given privilege on the container's target schema
-- from the given user.
--
CREATE PROCEDURE SYS_DI.REVOKE_CONTAINER_SCHEMA_PRIVILEGE
(
IN     CONTAINER_NAME       NVARCHAR(256),
IN     PRIVILEGE_NAME       NVARCHAR(256),
IN     USER_NAME            NVARCHAR(256),
OUT    REQUEST_ID           BIGINT,
OUT    RESULT_MESSAGES      SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.REVOKE_CONTAINER_SCHEMA_PRIVILEGES
--
-- Batch variant of the former procedure.
```

```
--
CREATE PROCEDURE SYS_DI.REVOKE_CONTAINER_SCHEMA_PRIVILEGES
(
IN     PRIVILEGES        SYS_DI.TT_CONTAINER_SCHEMA_PRIVILEGES,
OUT    REQUEST_ID        BIGINT,
OUT    RESULT_MESSAGES SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.GRANT_CONTAINER_METADATA_PRIVILEGE
--
-- Grants the given privilege on the container's metadata schemata
-- to the given user; for support use cases only.
--
CREATE PROCEDURE SYS_DI.GRANT_CONTAINER_METADATA_PRIVILEGE
(
IN     CONTAINER_NAME    NVARCHAR(256),
IN     PRIVILEGE_NAME    NVARCHAR(256),
IN     USER_NAME         NVARCHAR(256),
OUT    REQUEST_ID        BIGINT,
OUT    RESULT_MESSAGES   SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.REVOKE_CONTAINER_METADATA_PRIVILEGE
--
-- Revokes the given privilege on the container's metadata schemata
```

-- from the given user; for support use cases only.

--

CREATE PROCEDURE SYS_DI.REVOKE_CONTAINER_METADATA_PRIVILEGE (

| IN | CONTAINER_NAME | NVARCHAR(256), |
| IN | PRIVILEGE_NAME | NVARCHAR(256), |
| IN | USER_NAME | NVARCHAR(256), |
| OUT | REQUEST_ID | BIGINT, |
| OUT | RESULT_MESSAGES | SYS_DI.TT_MESSAGES |

)

AS BEGIN

SELECT SYS_DI.S_REQUEST_ID_.NEXTVAL INTO REQUEST_ID FROM DUMMY;

RESULT_MESSAGES = SELECT * FROM SYS_DI.T_RESULT_MESSAGES_EMPTY;

END;

-- SYS_DI.GRANT_CONTAINER_API_PRIVILEGE

--

-- Grants the given privilege on the container's API object

-- to the given user.

--

CREATE PROCEDURE SYS_DI.GRANT_CONTAINER_API_PRIVILEGE (

| IN | CONTAINER_NAME | NVARCHAR(256), |
| IN | PRIVILEGE_NAME | NVARCHAR(256), |
| IN | OBJECT_NAME | NVARCHAR(256), |
| IN | USER_NAME | NVARCHAR(256), |
| OUT | REQUEST_ID | BIGINT, |
| OUT | RESULT_MESSAGES | SYS_DI.TT_MESSAGES |

)

AS BEGIN

SELECT SYS_DI.S_REQUEST_ID_.NEXTVAL INTO REQUEST_ID FROM DUMMY;

RESULT_MESSAGES = SELECT * FROM SYS_DI.T_RESULT_MESSAGES_EMPTY;

END;

-- SYS_DI.GRANT_CONTAINER_API_PRIVILEGES
--
-- Batch variant of the former procedure.
--
CREATE PROCEDURE SYS_DI.GRANT_CONTAINER_API_PRIVILEGES
(
IN      PRIVILEGES          SYS_DI.TT_CONTAINER_API_PRIVILEGES,
OUT     REQUEST_ID          BIGINT,
OUT     RESULT_MESSAGES     SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;

-- SYS_DI.GRANT_CONTAINER_API_PRIVILEGE_WITH_GRANT_OPTION
--
-- Grants the given privilege on the container's API object
-- to the given user with grant option.
--
CREATE PROCEDURE
SYS_DI.GRANT_CONTAINER_API_PRIVILEGE_WITH_GRANT_OPTION
(
IN      CONTAINER_NAME      NVARCHAR(256),
IN      PRIVILEGE_NAME      NVARCHAR(256),
IN      OBJECT_NAME         NVARCHAR(256),
IN      USER_NAME           NVARCHAR(256),
OUT     REQUEST_ID          BIGINT,
OUT     RESULT_MESSAGES     SYS_DI.TT_MESSAGES
)
AS BEGIN

```
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
```

-- SYS_DI.GRANT_CONTAINER_API_PRIVILEGES_WITH_GRANT_OPTION
--
-- Batch variant of the former procedure.
--

```
CREATE PROCEDURE
SYS_DI.GRANT_CONTAINER_API_PRIVILEGES_WITH_GRANT_OPTION
(
IN    PRIVILEGES        SYS_DI.TT_CONTAINER_API_PRIVILEGES,
OUT   REQUEST_ID        BIGINT,
OUT   RESULT_MESSAGES   SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
```

-- SYS_DI.REVOKE_CONTAINER_API_PRIVILEGE
--
-- Revokes the given privilege on the container's API object
-- from the given user.
--

```
CREATE PROCEDURE SYS_DI.REVOKE_CONTAINER_API_PRIVILEGE
(
IN    CONTAINER_NAME    NVARCHAR(256),
IN    PRIVILEGE_NAME    NVARCHAR(256),
IN    OBJECT_NAME       NVARCHAR(256),
IN    USER_NAME         NVARCHAR(256),
OUT   REQUEST_ID        BIGINT,
```

```
OUT    RESULT_MESSAGES      SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.REVOKE_CONTAINER_API_PRIVILEGES
--
-- Batch variant of the former procedure.
--
CREATE PROCEDURE SYS_DI.REVOKE_CONTAINER_API_PRIVILEGES
(
IN     PRIVILEGES          SYS_DI.TT_CONTAINER_API_PRIVILEGES,
OUT    REQUEST_ID          BIGINT,
OUT    RESULT_MESSAGES SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.GRANT_CONTAINER_SCHEMA_ROLE
--
-- Grants the given role which is deployed inside the container
-- to the given user.
--
CREATE PROCEDURE SYS_DI.GRANT_CONTAINER_SCHEMA_ROLE
(
IN     CONTAINER_NAME      NVARCHAR(256),
IN     ROLE_NAME           NVARCHAR(256),
IN     USER_NAME           NVARCHAR(256),
OUT    REQUEST_ID          BIGINT,
```

```
OUT   RESULT_MESSAGES    SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.GRANT_CONTAINER_SCHEMA_ROLES
--
-- Batch variant of the former procedure.
--
CREATE PROCEDURE SYS_DI.GRANT_CONTAINER_SCHEMA_ROLES
(
IN    ROLES              SYS_DI.TT_CONTAINER_SCHEMA_ROLES,
OUT   REQUEST_ID         BIGINT,
OUT   RESULT_MESSAGES    SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.GRANT_CONTAINER_SCHEMA_ROLE_WITH_GRANT_OPTION
--
-- Grants the given role which is deployed inside the container
-- to the given user with grant option.
--
CREATE PROCEDURE
SYS_DI.GRANT_CONTAINER_SCHEMA_ROLE_WITH_GRANT_OPTION
(
IN    CONTAINER_NAME     NVARCHAR(256),
IN    ROLE_NAME          NVARCHAR(256),
IN    USER_NAME          NVARCHAR(256),
```

```
OUT    REQUEST_ID          BIGINT,
OUT    RESULT_MESSAGES     SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.GRANT_CONTAINER_SCHEMA_ROLES_WITH_GRANT_OPTION
--
-- Batch variant of the former procedure.
--
CREATE PROCEDURE
SYS_DI.GRANT_CONTAINER_SCHEMA_ROLES_WITH_GRANT_OPTION
(
IN     ROLES               SYS_DI.TT_CONTAINER_SCHEMA_ROLES,
OUT    REQUEST_ID          BIGINT,
OUT    RESULT_MESSAGES     SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.REVOKE_CONTAINER_SCHEMA_ROLE
--
-- Revokes the given role which is deployed inside the container
-- from the given user.
--
CREATE PROCEDURE SYS_DI.REVOKE_CONTAINER_SCHEMA_ROLE
(
IN     CONTAINER_NAME      NVARCHAR(256),
IN     ROLE_NAME           NVARCHAR(256),
```

```
IN    USER_NAME            NVARCHAR(256),
OUT   REQUEST_ID           BIGINT,
OUT   RESULT_MESSAGES      SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- SYS_DI.REVOKE_CONTAINER_SCHEMA_ROLES
--
-- Batch variant of the former procedure.
--
CREATE PROCEDURE SYS_DI.REVOKE_CONTAINER_SCHEMA_ROLES
(
IN    ROLES                SYS_DI.TT_CONTAINER_SCHEMA_ROLES,
OUT   REQUEST_ID           BIGINT,
OUT   RESULT_MESSAGES      SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
---------------------------------------------------------
--
-- Monitoring views
--
---------------------------------------------------------
-- SYS_DI.M_CONTAINERS
--
-- Monitoring view for existing containers.
--
```

```
-- begin:ignore
CREATE TABLE SYS_DI.CONTAINERS_
(
CONTAINER_NAME     NVARCHAR(256),
CREATE_USER_NAME   NVARCHAR(256),
CREATE_AUSER_NAME  NVARCHAR(256)
);
-- end:ignore
CREATE VIEW SYS_DI.M_CONTAINERS
AS
SELECT * FROM SYS_DI.CONTAINERS_;
-- SYS_DI.M_CONTAINER_SCHEMAS
--
-- Monitoring view for schema details about existing containers.
--
-- begin:ignore
CREATE TABLE SYS_DI.CONTAINER_SCHEMAS_
(
CONTAINER_NAME    NVARCHAR(256),
SCHEMA_NAME       NVARCHAR(256),
SCEHMA_TYPE       NVARCHAR(256)
);
-- end:ignore
CREATE VIEW SYS_DI.M_CONTAINER_SCHEMAS
AS
SELECT * FROM SYS_DI.CONTAINER_SCHEMAS_;
-- SYS_DI.M_MESSAGES
--
-- Monitoring view for result messages (from current and previous actions).
--
-- begin:ignore
```

```
CREATE TABLE SYS_DI.MESSAGES_
LIKE SYS_DI.TT_MESSAGES;
-- end:ignore
CREATE VIEW SYS_DI.M_MESSAGES
AS
SELECT * FROM SYS_DI.MESSAGES_;
```

---

--

-- Procedures

--

---

-- S#DI.WRITE

--

-- Writes/creates the given files/folders to/in the container's work file system.

--

-- PATHS:

-- - list of file/folders to write, including content

-- - a single path is either a fully qualified file path (e.g. "a/path/to/a/file.txt"), -- or a fully qualified folder path (e.g. "a/path/to/")

-- - the content of a file is either binary or UTF8 text

-- - the content of a folder needs to be NULL / is ignored

--

-- PARAMETERS:

-- - CREATE_FOLDERS, true/false

--

```
CREATE PROCEDURE S#DI.WRITE
(
IN     PATHS                SYS_DI.TT_FILESFOLDERS_CONTENT,
IN     PARAMETERS           SYS_DI.TT_PARAMETERS,
OUT    REQUEST_ID           BIGINT,
OUT    RESULT_MESSAGES      SYS_DI.TT_MESSAGES
```

)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;

-- S#DI.WRITE_SINGLE

--

-- Writes/creates the given file or folder to/in the container's work file system.

--

-- PATH:

-- - either a fully qualified file path (e.g. "a/path/to/a/file.txt")

-- - or a fully qualified folder path (e.g. "a/path/to/")

--

-- CONTENT:

-- - the content of the file (either binary, or UTF8 text)

-- - or NULL in case of a folder

--

-- PARAMETERS:

-- - CREATE_FOLDERS, true/false

--

CREATE PROCEDURE S#DI.WRITE_SINGLE
(
IN    PATH                NVARCHAR(511),
IN    CONTENT             BLOB,
IN    PARAMETERS          SYS_DI.TT_PARAMETERS,
OUT   REQUEST_ID          BIGINT,
OUT   RESULT_MESSAGES     SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;

END;

-- S#DI.DELETE

--

-- Deletes the given files/folders from/in the container's work file system.

--

-- PATHS:

-- - list of file/folders to delete

--

-- PARAMETERS:

-- - DELETE_RECURSIVE, true/false (like -r in rm -r)

-- - DELETE_FORCE, true/false (like -f in rm -f)

--

CREATE PROCEDURE S#DI.DELETE (

IN    PATHS                   SYS_DI.TT_FILESFOLDERS,

IN    PARAMETERS        SYS_DI.TT_PARAMETERS,

OUT  REQUEST_ID        BIGINT,

OUT  RESULT_MESSAGES   SYS_DI.TT_MESSAGES

)

AS BEGIN

SELECT SYS_DI.S_REQUEST_ID_.NEXTVAL INTO REQUEST_ID FROM DUMMY;

RESULT_MESSAGES = SELECT * FROM SYS_DI.T_RESULT_MESSAGES_EMPTY;

END;

-- S#DI.READ

--

-- Reads the given files/folders from the container's work file system.

--

-- PATHS:

-- - list of file/folders to read

--

-- READ_RESULT:

-- - files/folders incl. metadata and content

--

CREATE PROCEDURE S#DI.READ (

IN     PATHS                 SYS_DI.TT_FILESFOLDERS,

IN     PARAMETERS        SYS_DI.TT_PARAMETERS,

OUT   REQUEST_ID        BIGINT,

OUT   RESULT_MESSAGES   SYS_DI.TT_MESSAGES,

OUT   RESULT            SYS_DI.TT_FILESFOLDERS_METADATA_CONTENT

)

AS BEGIN

SELECT SYS_DI.S_REQUEST_ID_.NEXTVAL INTO REQUEST_ID FROM DUMMY;

RESULT_MESSAGES = SELECT * FROM SYS_DI.T_RESULT_MESSAGES_EMPTY;

RESULT = SELECT * FROM SYS_DI.T_FILESFOLDERS_METADATA_CONTENT_EMPTY;

END;

-- S#DI.READ_DEPLOYED

--

-- Reads the given files/folders from the container's deployed file system.

--

-- PATHS:

-- - list of file/folders to read

--

-- READ_RESULT:

-- - files/folders incl. metadata and content

--

CREATE PROCEDURE S#DI.READ_DEPLOYED (

IN     PATHS                 SYS_DI.TT_FILESFOLDERS,

IN     PARAMETERS        SYS_DI.TT_PARAMETERS,

OUT   REQUEST_ID        BIGINT,

```
OUT  RESULT_MESSAGES    SYS_DI.TT_MESSAGES,
OUT  RESULT             SYS_DI.TT_FILESFOLDERS_METADATA_CONTENT
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
  RESULT = SELECT * FROM
SYS_DI.T_FILESFOLDERS_METADATA_CONTENT_EMPTY;
END;
```

-- S#DI.LIST

--

-- Lists the given files/folders in the container's work file system.

--

-- PATHS:

-- - list of file/folders to list

--

-- PARAMETERS:

-- - RECURSIVE, true/false

-- - INCLUDE_FOLDERS, true/false

-- - INCLUDE_FILES, true/false

--

-- LIST_RESULT:

-- - files/folders incl. metadata (no content; use READ instead)

--

```
CREATE PROCEDURE S#DI.LIST
(
IN   PATHS              SYS_DI.TT_FILESFOLDERS,
IN   PARAMETERS         SYS_DI.TT_PARAMETERS,
OUT  REQUEST_ID         BIGINT,
OUT  RESULT_MESSAGES    SYS_DI.TT_MESSAGES,
OUT  RESULT             SYS_DI.TT_FILESFOLDERS_METADATA
```

)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
  RESULT = SELECT * FROM SYS_DI.T_FILESFOLDERS_METADATA_EMPTY;
END;

-- S#DI.LIST_DEPLOYED

--

-- Lists the given files/folders in the container's deployed file system.

--

-- PATHS:

-- - list of file/folders to list

--

-- PARAMETERS:

-- - RECURSIVE, true/false

-- - INCLUDE_FOLDERS, true/false

-- - INCLUDE_FILES, true/false

--

-- LIST_RESULT:

-- - files/folders incl. metadata (no content; use READ instead)

--

CREATE PROCEDURE S#DI.LIST_DEPLOYED
(
IN     PATHS              SYS_DI.TT_FILESFOLDERS,
IN     PARAMETERS         SYS_DI.TT_PARAMETERS,
OUT    REQUEST_ID         BIGINT,
OUT    RESULT_MESSAGES    SYS_DI.TT_MESSAGES,
OUT    RESULT             SYS_DI.TT_FILESFOLDERS_METADATA
)
AS BEGIN
  SELECT SYS_DI.S_REQUEST_ID_.NEXTVAL INTO REQUEST_ID FROM DUMMY;

```
    RESULT_MESSAGES = SELECT * FROM SYS_DI.T_RESULT_MESSAGES_EMPTY;
    RESULT = SELECT * FROM SYS_DI.T_FILESFOLDERS_METADATA_EMPTY;
END;
-- S#DI.STATUS
--
-- Shows the status of the given files/folders in the container's file systems.
--
-- PATHS:
-- - list of file/folders to check for their status
--
-- PARAMETERS:
-- - RECURSIVE, true/false
--
-- STATUS_RESULT:
-- - status of files/folders
--
CREATE PROCEDURE S#DI.STATUS
(
IN    PATHS              SYS_DI.TT_FILESFOLDERS,
IN    PARAMETERS         SYS_DI.TT_PARAMETERS,
OUT   REQUEST_ID         BIGINT,
OUT   RESULT_MESSAGES    SYS_DI.TT_MESSAGES,
OUT   RESULT             SYS_DI.TT_FILESFOLDERS_STATUS
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
  RESULT = SELECT * FROM SYS_DI.T_FILESFOLDERS_STATUS_EMPTY;
END;
-- S#DI.MAKE
--
```

-- Triggers a make with the given set of files/folders.

--

-- DEPLOY_PATHS:

-- - list of files/folders for deployment

--

-- UNDEPLOY_PATHS:

-- - list of files/folders for undeployment

--

-- PATH_PARAMETERS:

-- - file/folder-level parameters

--

-- PARAMETERS:

-- - global parameters

--

```
CREATE PROCEDURE S#DI.MAKE
(
IN      DEPLOY_PATHS        SYS_DI.TT_FILESFOLDERS,
IN      UNDEPLOY_PATHS      SYS_DI.TT_FILESFOLDERS,
IN      PATH_PARAMETERS     SYS_DI.TT_FILESFOLDERS_PARAMETERS,
IN      PARAMETERS          SYS_DI.TT_PARAMETERS,
OUT     REQUEST_ID          BIGINT,
OUT     RESULT_MESSAGES     SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
```

-- S#DI.MAKE_ASYNC

--

-- Triggers a make with the given set of files/folders in asynchronous mode.

-- The call returns with a REQUEST_ID while the make continuous to run in

-- the background.

-- The status of the make can be checked via M_JOBS and M_MESSAGES.

--

-- DEPLOY_PATHS:

-- - list of files/folders for deployment

--

-- UNDEPLOY_PATHS:

-- - list of files/folders for undeployment

--

-- PATH_PARAMETERS:

-- - file/folder-level parameters

--

-- PARAMETERS:

-- - global parameters

--

CREATE PROCEDURE S#DI.MAKE_ASYNC (

| | | |
|---|---|---|
| IN | DEPLOY_PATHS | SYS_DI.TT_FILESFOLDERS, |
| IN | UNDEPLOY_PATHS | SYS_DI.TT_FILESFOLDERS, |
| IN | PATH_PARAMETERS | SYS_DI.TT_FILESFOLDERS_PARAMETERS, |
| IN | PARAMETERS | SYS_DI.TT_PARAMETERS, |
| OUT | REQUEST_ID | BIGINT, |
| OUT | RESULT_MESSAGES | SYS_DI.TT_MESSAGES |

)

AS BEGIN

SELECT SYS_DI.S_REQUEST_ID_.NEXTVAL INTO REQUEST_ID FROM DUMMY;

RESULT_MESSAGES = SELECT * FROM SYS_DI.T_RESULT_MESSAGES_EMPTY;

END;

-- S#DI.CANCEL

--

-- Tries to cancel the asynchronous request with the given REQUEST_ID.

--
-- CANCEL_REQUEST_ID:
-- - REQUEST_ID of the request to cancel
--
CREATE PROCEDURE S#DI.CANCEL
(
IN    CANCEL_REQUEST_ID    BIGINT,
OUT   REQUEST_ID           BIGINT,
OUT   RESULT_MESSAGES      SYS_DI.TT_MESSAGES
)
AS BEGIN
  SELECT SYS_DI.S_REQUEST_ID_.NEXTVAL INTO REQUEST_ID FROM DUMMY;
  RESULT_MESSAGES = SELECT * FROM SYS_DI.T_RESULT_MESSAGES_EMPTY;
END;
-- S#DI.GRANT_SCHEMA_PRIVILEGE
--
-- Grants the given privilege on the container's target schema
-- to the given user.
--
CREATE PROCEDURE S#DI.GRANT_SCHEMA_PRIVILEGE
(
IN    PRIVILEGE_NAME       NVARCHAR(256),
IN    USER_NAME            NVARCHAR(256),
OUT   REQUEST_ID           BIGINT,
OUT   RESULT_MESSAGES      SYS_DI.TT_MESSAGES
)
AS BEGIN
  CALL SYS_DI.GRANT_CONTAINER_SCHEMA_PRIVILEGE('S', :PRIVILEGE_NAME, :USER_NAME, REQUEST_ID, RESULT_MESSAGES);
END;
-- S#DI.GRANT_SCHEMA_PRIVILEGES --
-- Batch variant of the former procedure.
--
CREATE PROCEDURE S#DI.GRANT_SCHEMA_PRIVILEGES
(
IN     PRIVILEGES              SYS_DI.TT_SCHEMA_PRIVILEGES,
       OUT   REQUEST_ID        BIGINT,
OUT   RESULT_MESSAGES          SYS_DI.TT_MESSAGES
)
AS BEGIN
 CONTAINER_PRIVILEGES = SELECT 'S', PRIVILEGE_NAME, USER_NAME FROM :PRIVILEGES;
 CALL SYS_DI.GRANT_CONTAINER_SCHEMA_PRIVILEGES(:CONTAINER_PRIVILEGES, REQUEST_ID, RESULT_MESSAGES);
END;
-- S#DI.GRANT_SCHEMA_PRIVILEGE_WITH_GRANT_OPTION
--
-- Grants the given privilege on the container's target schema
-- to the given user with grant option.
--
CREATE PROCEDURE S#DI.GRANT_SCHEMA_PRIVILEGE_WITH_GRANT_OPTION
(
IN     PRIVILEGE_NAME          NVARCHAR(256),
IN     USER_NAME               NVARCHAR(256),
OUT   REQUEST_ID               BIGINT,
OUT   RESULT_MESSAGES          SYS_DI.TT_MESSAGES
)
AS BEGIN

```
  CALL
SYS_DI.GRANT_CONTAINER_SCHEMA_PRIVILEGE_WITH_GRANT_OPTION('S',
:PRIVILEGE_NAME, :USER_NAME, REQUEST_ID, RESULT_MESSAGES);
END;
-- S#DI.GRANT_SCHEMA_PRIVILEGES_WITH_GRANT_OPTION
--
-- Batch variant of the former procedure.
--
CREATE PROCEDURE S#DI.GRANT_SCHEMA_PRIVILEGES_WITH_GRANT_OPTION
(
IN      PRIVILEGES          SYS_DI.TT_SCHEMA_PRIVILEGES,
OUT     REQUEST_ID          BIGINT,
OUT     RESULT_MESSAGES     SYS_DI.TT_MESSAGES
)
AS BEGIN
 CONTAINER_PRIVILEGES = SELECT 'S', PRIVILEGE_NAME, USER_NAME FROM
:PRIVILEGES;
 CALL
SYS_DI.GRANT_CONTAINER_SCHEMA_PRIVILEGES_WITH_GRANT_OPTION(:CONT
AINER_PRIVILEGES, REQUEST_ID, RESULT_MESSAGES);
END;
-- S#DI.REVOKE_SCHEMA_PRIVILEGE
--
-- Revokes the given privilege on the container's target schema
-- from the given user.
--
CREATE PROCEDURE S#DI.REVOKE_SCHEMA_PRIVILEGE
(
IN      PRIVILEGE_NAME      NVARCHAR(256),
IN      USER_NAME           NVARCHAR(256),
OUT     REQUEST_ID          BIGINT,
```

```
    OUT  RESULT_MESSAGES       SYS_DI.TT_MESSAGES
)
AS BEGIN
    CALL SYS_DI.REVOKE_CONTAINER_SCHEMA_PRIVILEGE('S', :PRIVILEGE_NAME,
:USER_NAME, REQUEST_ID, RESULT_MESSAGES);
END;
-- S#DI.REVOKE_SCHEMA_PRIVILEGES
--
-- Batch variant of the former procedure.
--
CREATE PROCEDURE S#DI.REVOKE_SCHEMA_PRIVILEGES
(
    IN   PRIVILEGES            SYS_DI.TT_SCHEMA_PRIVILEGES,
    OUT  REQUEST_ID            BIGINT,
    OUT  RESULT_MESSAGES       SYS_DI.TT_MESSAGES
)
AS BEGIN
    CONTAINER_PRIVILEGES = SELECT 'S', PRIVILEGE_NAME, USER_NAME FROM
:PRIVILEGES;
    CALL
SYS_DI.REVOKE_CONTAINER_SCHEMA_PRIVILEGES(:CONTAINER_PRIVILEGES,
REQUEST_ID, RESULT_MESSAGES);
END;
-- S#DI.GRANT_API_PRIVILEGE
--
-- Grants the given privilege on the container's API object
-- to the given user.
--
CREATE PROCEDURE S#DI.GRANT_API_PRIVILEGE
(
    IN   PRIVILEGE_NAME        NVARCHAR(256),
```

```
IN      OBJECT_NAME         NVARCHAR(256),
IN      USER_NAME           NVARCHAR(256),
OUT     REQUEST_ID          BIGINT,
OUT     RESULT_MESSAGES     SYS_DI.TT_MESSAGES
)
AS BEGIN
  CALL SYS_DI.GRANT_CONTAINER_API_PRIVILEGE('S', :PRIVILEGE_NAME,
:OBJECT_NAME, :USER_NAME, REQUEST_ID, RESULT_MESSAGES);
END;
-- S#DI.GRANT_API_PRIVILEGES
--
-- Batch variant of the former procedure.
--
CREATE PROCEDURE S#DI.GRANT_API_PRIVILEGES
(
IN      PRIVILEGES          SYS_DI.TT_API_PRIVILEGES,
OUT     REQUEST_ID          BIGINT,
OUT     RESULT_MESSAGES     SYS_DI.TT_MESSAGES
)
AS BEGIN
  CONTAINER_PRIVILEGES = SELECT 'S', PRIVILEGE_NAME, USER_NAME FROM
:PRIVILEGES;
  CALL SYS_DI.GRANT_CONTAINER_API_PRIVILEGES(:CONTAINER_PRIVILEGES,
REQUEST_ID, RESULT_MESSAGES);
END;
-- S#DI.GRANT_API_PRIVILEGE_WITH_GRANT_OPTION
--
-- Grants the given privilege on the container's API object
-- to the given user with grant option.
--
CREATE PROCEDURE S#DI.GRANT_API_PRIVILEGE_WITH_GRANT_OPTION
```

```
(
  IN   PRIVILEGE_NAME    NVARCHAR(256),
  IN   OBJECT_NAME       NVARCHAR(256),
  IN   USER_NAME         NVARCHAR(256),
  OUT  REQUEST_ID        BIGINT,
  OUT  RESULT_MESSAGES   SYS_DI.TT_MESSAGES
)
AS BEGIN
 CALL SYS_DI.GRANT_CONTAINER_API_PRIVILEGE_WITH_GRANT_OPTION('S',
:PRIVILEGE_NAME, :OBJECT_NAME, :USER_NAME, REQUEST_ID,
RESULT_MESSAGES);
END;
-- S#DI.GRANT_API_PRIVILEGES_WITH_GRANT_OPTION
--
-- Batch variant of the former procedure.
--
CREATE PROCEDURE S#DI.GRANT_API_PRIVILEGES_WITH_GRANT_OPTION
(
  IN   PRIVILEGES        SYS_DI.TT_API_PRIVILEGES,
  OUT  REQUEST_ID        BIGINT,
  OUT  RESULT_MESSAGES   SYS_DI.TT_MESSAGES
)
AS BEGIN
 CONTAINER_PRIVILEGES = SELECT 'S', PRIVILEGE_NAME, USER_NAME FROM
:PRIVILEGES;
 CALL
SYS_DI.GRANT_CONTAINER_API_PRIVILEGES_WITH_GRANT_OPTION(:CONTAINE
R_PRIVILEGES, REQUEST_ID, RESULT_MESSAGES);
END;
-- S#DI.REVOKE_API_PRIVILEGE
--
```

```
-- Revokes the given privilege on the container's API object
-- from the given user.
--
CREATE PROCEDURE S#DI.REVOKE_API_PRIVILEGE
(
    IN    PRIVILEGE_NAME     NVARCHAR(256),
    IN    OBJECT_NAME        NVARCHAR(256),
    IN    USER_NAME          NVARCHAR(256),
    OUT   REQUEST_ID         BIGINT,
    OUT   RESULT_MESSAGES    SYS_DI.TT_MESSAGES
)
AS BEGIN
  CALL SYS_DI.REVOKE_CONTAINER_API_PRIVILEGE('S', PRIVILEGE_NAME,
:OBJECT_NAME, :USER_NAME, REQUEST_ID, RESULT_MESSAGES);
END;
-- S#DI.REVOKE_API_PRIVILEGES
--
-- Batch variant of the former procedure.
--
CREATE PROCEDURE S#DI.REVOKE_API_PRIVILEGES
(
    IN    PRIVILEGES         SYS_DI.TT_API_PRIVILEGES,
    OUT   REQUEST_ID         BIGINT,
    OUT   RESULT_MESSAGES    SYS_DI.TT_MESSAGES
)
AS BEGIN
  CONTAINER_PRIVILEGES = SELECT 'S', PRIVILEGE_NAME, USER_NAME FROM
:PRIVILEGES;
  CALL SYS_DI.REVOKE_CONTAINER_API_PRIVILEGES(:CONTAINER_PRIVILEGES,
REQUEST_ID, RESULT_MESSAGES);
END;
```

-- S#DI.GRANT_SCHEMA_ROLE

--

-- Grants the given role which is deployed inside the container

-- to the given user.

--

CREATE PROCEDURE S#DI.GRANT_SCHEMA_ROLE (

IN      ROLE_NAME           NVARCHAR(256),

IN      USER_NAME           NVARCHAR(256),

OUT     REQUEST_ID          BIGINT,

OUT     RESULT_MESSAGES     SYS_DI.TT_MESSAGES

)

AS BEGIN

CALL SYS_DI.GRANT_CONTAINER_SCHEMA_ROLE('S', :ROLE_NAME, :USER_NAME, REQUEST_ID, RESULT_MESSAGES);

END;

-- S#DI.GRANT_SCHEMA_ROLES

--

-- Batch variant of the former procedure.

--

CREATE PROCEDURE S#DI.GRANT_SCHEMA_ROLES (

IN      ROLES               SYS_DI.TT_SCHEMA_ROLES,

OUT     REQUEST_ID          BIGINT,

OUT     RESULT_MESSAGES     SYS_DI.TT_MESSAGES

)

AS BEGIN

CONTAINER_ROLES = SELECT 'S', ROLE_NAME, USER_NAME FROM :ROLES;

CALL SYS_DI.GRANT_CONTAINER_SCHEMA_ROLES(:CONTAINER_ROLES, REQUEST_ID, RESULT_MESSAGES);

END;

```
-- S#DI.GRANT_SCHEMA_ROLE_WITH_GRANT_OPTION
--
-- Grants the given role which is deployed inside the container
-- to the given user with grant option.
--
CREATE PROCEDURE S#DI.GRANT_SCHEMA_ROLE_WITH_GRANT_OPTION
(
IN      ROLE_NAME             NVARCHAR(256),
IN      USER_NAME             NVARCHAR(256),
OUT     REQUEST_ID            BIGINT,
OUT     RESULT_MESSAGES       SYS_DI.TT_MESSAGES
)
AS BEGIN
 CALL SYS_DI.GRANT_CONTAINER_SCHEMA_ROLE_WITH_GRANT_OPTION('S',
:ROLE_NAME, :USER_NAME, REQUEST_ID, RESULT_MESSAGES);
END;
-- S#DI.GRANT_SCHEMA_ROLES_WITH_GRANT_OPTION
--
-- Batch variant of the former procedure.
--
CREATE PROCEDURE S#DI.GRANT_SCHEMA_ROLES_WITH_GRANT_OPTION
(
IN      ROLES                 SYS_DI.TT_SCHEMA_ROLES,
OUT     REQUEST_ID            BIGINT,
OUT     RESULT_MESSAGES       SYS_DI.TT_MESSAGES
)
AS BEGIN
 CONTAINER_ROLES = SELECT 'S', ROLE_NAME, USER_NAME FROM :ROLES;
 CALL SYS_DI.GRANT_CONTAINER_SCHEMA_ROLES_WITH_GRANT_OPTION(:CONTAINER_ROLES, REQUEST_ID, RESULT_MESSAGES);
```

END;

-- S#DI.REVOKE_SCHEMA_ROLE

--

-- Revokes the given role which is deployed inside the container

-- from the given user.

--

CREATE PROCEDURE S#DI.REVOKE_SCHEMA_ROLE (

IN     ROLE_NAME           NVARCHAR(256),

IN     USER_NAME           NVARCHAR(256),

OUT    REQUEST_ID          BIGINT,

OUT    RESULT_MESSAGES     SYS_DI.TT_MESSAGES

)

AS BEGIN

CALL SYS_DI.REVOKE_CONTAINER_SCHEMA_ROLE('S', :ROLE_NAME, :USER_NAME, REQUEST_ID, RESULT_MESSAGES);

END;

-- S#DI.REVOKE_SCHEMA_ROLES

--

-- Batch variant of the former procedure.

--

CREATE PROCEDURE S#DI.REVOKE_SCHEMA_ROLES (

IN     ROLES               SYS_DI.TT_SCHEMA_ROLES,

OUT    REQUEST_ID          BIGINT,

OUT    RESULT_MESSAGES     SYS_DI.TT_MESSAGES

)

AS BEGIN

CONTAINER_ROLES = SELECT 'S', ROLE_NAME, USER_NAME FROM :ROLES;

CALL SYS_DI.REVOKE_CONTAINER_SCHEMA_ROLES(:CONTAINER_ROLES, REQUEST_ID, RESULT_MESSAGES);

END;

---

--
-- Monitoring views
--

---

-- S#DI.M_MESSAGES

--

-- Monitoring view for result messages (from current and previous actions).

--

-- begin:ignore

CREATE TABLE S#DI.MESSAGES_

LIKE SYS_DI.TT_MESSAGES;

-- end:ignore

CREATE VIEW S#DI.M_MESSAGES

AS

SELECT * FROM S#DI.MESSAGES_;

-- S#DI.M_JOBS

--

-- Monitoring view for current jobs inside the container.

--

-- begin:ignore

CREATE TABLE S#DI.JOBS_

(

| | |
|---|---|
| REQUEST_ID | BIGINT, |
| USER_NAME | NVARCHAR(256), |
| AUSER_NAME | NVARCHAR(256), |
| CONNECTION_ID | INT, |
| START_TIMESTAMP_UTC | TIMESTAMP, |
| CURRENT_JOB | BIGINT, |
| NUM_JOBS | BIGINT, |

```
STATUS                   NVARCHAR(256),
UPDATE_TIMESTAMP_UTC     TIMESTAMP,
INTERNAL_CONNECTION_ID   INT
);
-- end:ignore
CREATE VIEW S#DI.M_JOBS
AS
SELECT * FROM S#DI.JOBS_;
-- S#DI.M_ROLES
--
-- Monitoring view for all deployed roles inside the container
-- which are owned by the container's object owner
--
-- begin:ignore
CREATE TABLE S#DI.ROLES_
(
ROLE_NAME                NVARCHAR(256)
);
-- end:ignore
CREATE VIEW S#DI.M_ROLES
AS
SELECT * FROM S#DI.ROLES_;
```

What is claimed:

1. A computer-implemented method, comprising:
generating, using a deployment infrastructure of a database system, a deployment container for deployment of at least one object at runtime of an application, the deployment container including at least one artifact for the at least one object and a container schema indicative of at least one dependency associated with the at least one object, the at least one artifact comprising a synonym including a link to an external schema object contained within an isolated container;
associating, based on the container schema, at least one deployment privilege with the at least one artifact for the at least one object;
requesting an access privilege to the external schema object contained within the isolated container;
accessing the external schema object based on the access privilege received in response to the requesting; and
deploying, based on the associated deployment schema and the accessing, the at least one artifact of the deployment container during runtime of the application, the deploying comprising deploying the at least one artifact using the deployment container, the synonym linking the external schema object to the at least one object using a schema-local name;
wherein the at least one of the generating, the associating, and the deploying is performed by at least one processor of at least one computing system.

2. The method according to claim 1, wherein the at least one artifact represents a target state of the at least one object during runtime of the application, wherein the artifact specifies a view definition of the at least one object in the target state.

3. The method according to claim 1, wherein the artifact includes at least one of the following: a data definition language artifact, a synonym, a table, a view, a role, a privilege, a configuration, a core data service, a function, an index, and any combination thereof.

4. The method according to claim 1, further comprising repeatedly deploying the at least one artifact of the at least one container during runtime of the application.

5. The method according to claim 1, wherein the deploying includes at least one of the following: creating the at least one object during runtime of the application, modifying the at least one object during runtime of the application, and deleting the at least one object during runtime of the application.

6. The method according to claim 1, wherein the at least one artifact provides a link to at least another artifact of at least another deployment container;
wherein the deploying of the at least one artifact is independent of the at least another artifact of the at least another deployment container.

7. The method according to claim 1, wherein the deploying of the at least one artifact during runtime of the application is performed based on a deployment order specified by the at least one dependency.

8. The method according to claim 1, further comprising isolating the container based on at least one of the following: a database schema, a metadata schema, a database privilege, a technical user associated with the container, a technical user associated with a container schema, and any combination thereof.

9. The method according to claim 1, wherein generating the deployment container further comprises:
creating a container schema owner configured to grant and/or revoke privileges to the container schema; and
creating a container object owner configured to create database objects within the container schema.

10. A system comprising:
at least one programmable processor; and
a machine-readable medium storing instructions that, when executed by the at least one programmable processor, cause the at least one programmable processor to perform operations comprising:
generating, using a deployment infrastructure of a database system, a deployment container for deployment of at least one object at runtime of an application, the deployment container including at least one artifact for the at least one object and a container schema indicative of at least one dependency associated with the at least one object, the at least one artifact comprising a synonym including a link to an external schema object contained within an isolated container;
associating, based on the container schema, at least one deployment privilege with the at least one artifact for the at least one object;
requesting an access privilege to the external schema object contained within the isolated container;
accessing the external schema object based on the access privilege received in response to the requesting; and
deploying, by the deployment container and based on the associated deployment schema and the accessing, the at least one artifact during runtime of the application, the synonym linking the external schema object to the at least one object using a schema-local name.

11. The system according to claim 10, wherein the at least one artifact represents a target state of the at least one object during runtime of the application, wherein the artifact specifies a view definition of the at least one object in the target state.

12. The system according to claim 10, wherein the artifact includes at least one of the following: a data definition language artifact, a synonym, a table, a view, a role, a privilege, a configuration, a core data service, a function, an index, and any combination thereof.

13. The system according to claim 10, further comprising repeatedly deploying the at least one artifact of the at least one container during runtime of the application.

14. The system according to claim 10, wherein the deploying includes at least one of the following: creating the at least one object during runtime of the application, modifying the at least one object during runtime of the application, and deleting the at least one object during runtime of the application.

15. The system according to claim 10, wherein the at least one artifact provides a link to at least another artifact of at least another deployment container;
wherein the deploying of the at least one artifact is independent of the at least another artifact of the at least another deployment container.

16. The system according to claim 10, wherein the deploying of the at least one artifact during runtime of the application is performed based on a deployment order specified by the at least one dependency.

17. The system according to claim 10, wherein the operations further comprise isolating the container based on at least one of the following: a database schema, a metadata schema, a database privilege, a technical user associated with the container, a technical user associated with a container schema, and any combination thereof.

18. The system according to claim 10, wherein generating the deployment container further comprises:
- creating a container schema owner configured to grant and/or revoke privileges to the container schema; and
- creating a container object owner configured to create database objects within the container schema.

19. A computer program product comprising a non-transitory machine-readable medium storing instructions that, when executed by at least one programmable processor, cause the at least one programmable processor to perform operations comprising:
- generating, using a deployment infrastructure of a database system, a deployment container for deployment of at least one object at runtime of an application, the deployment container including at least one artifact for the at least one object and a container schema indicative of at least one dependency associated with the at least one object, the at least one artifact comprising a synonym including a link to an external schema object contained within an isolated container;
- associating, based on the container schema, at least one deployment privilege with the at least one artifact for the at least one object;
- requesting an access privilege to the external schema object contained within the isolated container;
- accessing the external schema object based on the access privilege received in response to the requesting; and
- deploying, by the deployment container and based on the associated deployment schema and the accessing, the at least one artifact during runtime of the application, the synonym linking the external schema object to the at least one object using a schema-local name.

20. The computer program product according to claim 19, wherein the at least one artifact represents a target state of the at least one object during runtime of the application, wherein the artifact specifies a view definition of the at least one object in the target state;
- wherein the artifact includes at least one of the following: a data definition language artifact, a synonym, a table, a view, a role, a privilege, a configuration, a core data service, a function, an index, and any combination thereof.

* * * * *